US008874290B2

(12) United States Patent
Kumazaki et al.

(10) Patent No.: US 8,874,290 B2
(45) Date of Patent: Oct. 28, 2014

(54) CONTROL DEVICE FOR VEHICLE POWER TRANSMISSION DEVICE

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 178 days.

(21) Appl. No.: 13/321,428

(22) PCT Filed: May 19, 2009

(86) PCT No.: PCT/JP2009/059208
§ 371 (c)(1),
(2), (4) Date: Nov. 18, 2011

(87) PCT Pub. No.: WO2010/134165
PCT Pub. Date: Nov. 25, 2010

(65) Prior Publication Data
US 2012/0072064 A1    Mar. 22, 2012

(51) Int. Cl.
B60L 11/00    (2006.01)
F16H 59/36   (2006.01)
F16H 61/02   (2006.01)
F16H 61/00   (2006.01)

(52) U.S. Cl.
CPC ............. *F16H 61/0213* (2013.01); *Y02T 10/76* (2013.01); *F16H 2059/366* (2013.01); *F16H 2061/022* (2013.01); *F16H 2061/0015* (2013.01)
USPC .................... 701/22; 701/51; 701/52; 701/54; 701/68; 477/3; 477/15; 180/65.2; 180/65.275; 180/65.285; 192/3.63

(58) Field of Classification Search
USPC ........ 701/51, 52, 54, 68; 477/3, 15; 180/65.2, 180/65.275, 65.285; 192/3.63
See application file for complete search history.

(56) References Cited

U.S. PATENT DOCUMENTS 4,211,930 A    7/1980  Fengler
5,088,350 A    2/1992  Kurihara et al.
(Continued)

FOREIGN PATENT DOCUMENTS

DE          43 44 053 A1    7/1994
DE    10 2006 009 589 A1    9/2007
(Continued)

OTHER PUBLICATIONS

International Search Report Issued Aug. 18, 2009 in PCT/JP09/059208 Filed May 19, 2009.

(Continued)

*Primary Examiner* — James Trammell
*Assistant Examiner* — Sanjeev Malhotra
(74) *Attorney, Agent, or Firm* — Oblon, Spivak, McClelland, Maier & Neustadt, L.L.P.

(57) ABSTRACT

It is provided a control device for a vehicle power transmission device having a stepped automatic transmission making up a portion of a power transmission path between an engine and a drive wheel, the control device setting a shift point of the automatic transmission in accordance with a request drive force of a driver and a vehicle speed, the control device setting a shift point of the automatic transmission in accordance with a rotation speed of the engine and a vehicle speed instead of the request drive force, if a vehicle is in a predetermined fuel consumption priority running state.

20 Claims, 9 Drawing Sheets

(56) References Cited

U.S. PATENT DOCUMENTS

| | | | |
|---|---|---|---|
| 5,275,069 A | 1/1994 | Baba et al. | |
| 5,732,681 A | 3/1998 | Ogita | |
| 5,878,364 A | 3/1999 | Kuroda et al. | |
| 5,947,861 A | 9/1999 | Nobumoto | |
| 6,914,410 B2 | 7/2005 | Morgante et al. | |
| 7,555,374 B2 | 6/2009 | Wu et al. | |
| 7,568,994 B2* | 8/2009 | Heap | 477/3 |
| 7,854,680 B2* | 12/2010 | Sugai et al. | 477/15 |
| 8,342,274 B2 | 1/2013 | Imamura et al. | |
| 2003/0173125 A1* | 9/2003 | Ishikawa | 180/65.2 |
| 2003/0203790 A1 | 10/2003 | Matsubara et al. | |
| 2004/0044456 A1* | 3/2004 | Tokuda et al. | 701/51 |
| 2005/0209760 A1 | 9/2005 | Tabata et al. | |
| 2006/0030452 A1 | 2/2006 | Tsukada et al. | |
| 2007/0175720 A1* | 8/2007 | Yoshida et al. | 192/3.63 |
| 2007/0244616 A1* | 10/2007 | Roudeau et al. | 701/52 |
| 2008/0120001 A1* | 5/2008 | Heap | 701/54 |
| 2008/0140290 A1* | 6/2008 | Kuwahara et al. | 701/54 |
| 2009/0042691 A1 | 2/2009 | Matsubara et al. | |
| 2009/0069965 A1 | 3/2009 | Tabata et al. | |
| 2009/0069966 A1 | 3/2009 | Tabata et al. | |
| 2009/0075774 A1 | 3/2009 | Tabata et al. | |
| 2010/0145584 A1* | 6/2010 | Kojima | 701/68 |
| 2010/0263951 A1* | 10/2010 | Hayashi et al. | 180/65.275 |
| 2011/0127095 A1* | 6/2011 | Imamura et al. | 180/65.285 |

FOREIGN PATENT DOCUMENTS

| | | |
|---|---|---|
| DE | 10 2007 056 883 A1 | 6/2008 |
| DE | 601 30 484 T2 | 6/2008 |
| DE | 10 2008 002 165 A1 | 12/2008 |
| JP | 62 273183 | 11/1987 |
| JP | 01 116358 | 5/1989 |
| JP | 03-219163 | 9/1991 |
| JP | 04-316759 | 11/1992 |
| JP | 05-079556 | 3/1993 |
| JP | 06 144085 | 5/1994 |
| JP | 09 133208 | 5/1997 |
| JP | 09 184567 | 7/1997 |
| JP | 11 218215 | 8/1999 |
| JP | 2003 322249 | 11/2003 |
| JP | 2004-251178 | 9/2004 |
| JP | 2005-240917 | 9/2005 |
| JP | 2005-273900 | 10/2005 |
| JP | 2006 046521 | 2/2006 |
| JP | 2007 231963 | 9/2007 |
| JP | 2009 041629 | 2/2009 |
| WO | 2008/059337 | 5/2008 |
| WO | 2008/133334 | 11/2008 |

OTHER PUBLICATIONS

International Search Report issued Dec. 1, 2009, in PCT/IB2009/006663.

Written Opinion issued Dec. 1, 2009 in PCT/IB2009/006663.

Notice of Allowance mailed Sep. 26, 2012, in co-pending U.S. Appl. No. 13/056,045.

Office Action issued Apr. 15, 2010 in Japanese Application No. 2008-222741 (With English Translation).

* cited by examiner

| | C1 | C2 | C3 | B1 | B2 | F1 | GEAR RATIO | STEP |
|---|---|---|---|---|---|---|---|---|
| 1st | O | | | | (O) | O | 3.20 | |
| | | | | | | | | 1.86 |
| 2nd | O | | | O | | | 1.72 | |
| | | | | | | | | 1.72 |
| 3rd | O | O | | | | | 1.00 | |
| | | | | | | | | 1.49 |
| 4th | | O | | O | | | 0.67 | |
| | | | | | | | | GEAR RATIO WIDTH |
| Rev | | | O | | O | | 2.04 | |
| | | | | | | | | 4.76 |
| N | | | | | | | | |

CONTROL DEVICE FOR VEHICLE POWER TRANSMISSION DEVICE

TECHNICAL FIELD

The present invention relates to a technique for improving fuel consumption in a vehicle having an automatic transmission.

BACKGROUND ART

A control device for a vehicle power transmission device is conventionally known that executes a shift of a stepped automatic transmission disposed between an engine and a drive wheel based on a predetermined shift map (shift line diagram). For example, one example is a control device for a vehicle power transmission device described in Patent Document 1. The control device for a vehicle power transmission device of Patent Document 1 has two types of running modes, which are a normal running mode and a fuel consumption saving running mode of running with an engine rotation speed suppressed as compared to the normal running mode. The control device stores a shift map for the normal running mode and a shift map for the fuel consumption saving running mode in advance so as to realize the two types of running modes. In either of the shift maps, a vehicle speed and an accelerator opening degree are used as parameters, i.e., a shift point of the automatic transmission is set by the vehicle speed and the accelerator opening degree.

PRIOR ART DOCUMENT

Patent Document

Patent Document 1: Japanese Laid-Open Patent Publication No. 2007-231963

SUMMARY OF THE INVENTION

Problem to be Solved by the Invention

The control device for a vehicle power transmission device of Patent Document 1 does not change the parameters of the shift maps from a vehicle speed and an accelerator opening degree in either of the two types of running modes.

If consumption of engine output increases for a purpose other than running of a vehicle, for example, in such a case that a request for electric power (demand for electric power) from accessories such as an air conditioner is increased, an operation point of the engine may be changed toward higher output so as to increase electric power generation from engine output even though the vehicle speed and the accelerator opening degree are not changed. Since such a change in the operation point of the engine causes a change in input to the vehicle power transmission device (automatic transmission), power transmission efficiency (hereinafter, simply "transmission efficiency") of the vehicle power transmission device (automatic transmission) may possibly be changed. In other words, although a shift of the automatic transmission is not executed based on the shift map because the vehicle speed and the accelerator opening degree are not changed, the transmission efficiency of the vehicle power transmission device may possibly be changed.

Therefore, when the transmission efficiency of the vehicle power transmission device is changed, this is not a problem if the transmission efficiency is the highest in the current shift stage of the automatic transmission; however, if the transmission efficiency can be improved by executing a shift of the automatic transmission rather than maintaining the current shift stage, it is thought that the fuel consumption may be deteriorated on the contrary by maintaining the current shift stage based on the shift map using the vehicle speed and the accelerator opening degree as parameters. Such a problem is not known.

The present invention was conceived in view of the situations and it is therefore an object of the present invention to provide a control device for a vehicle power transmission device capable of improving fuel consumption by appropriately executing a shift of an automatic transmission making up a portion of a power transmission path between an engine and a drive wheel.

Means for Solving the Problems

To achieve the above object, the first aspect of the present invention provides (a) a control device for a vehicle power transmission device having a stepped automatic transmission making up a portion of a power transmission path between an engine and a drive wheel, the control device setting a shift point of the automatic transmission in accordance with a request drive force of a driver and a vehicle speed, (b) the control device setting a shift point of the automatic transmission in accordance with a rotation speed of the engine and a vehicle speed instead of the request drive force, if a vehicle is in a predetermined fuel consumption priority running state.

The second aspect of the invention provides the control device for a vehicle power transmission device, wherein the case of the predetermined fuel consumption priority running state of the vehicle is the case that a fuel consumption priority running mode is manually selected to improve fuel consumption as compared to when the mode is not selected.

The third aspect of the invention provides the control device for a vehicle power transmission device, wherein (a) the control device is disposed with an electric storage device charged by an electric generator rotationally driven by the engine, and wherein (b) the case of the fuel consumption priority running state of the vehicle is the case that an output request amount requested to the engine for charging the electric storage device is equal to or greater than a predetermined output request amount determination value.

The fourth aspect of the invention provides the control device for a vehicle power transmission device, wherein the case of the fuel consumption priority running state of the vehicle is the case that a remaining amount of fuel to be supplied to the engine is less than a predetermined fuel remaining amount determination value.

The fifth aspect of the invention provides the control device for a vehicle power transmission device, wherein (a) the control device is disposed with an electric storage device charged by an electric generator rotationally driven by the engine, and wherein (b) the case of the fuel consumption priority running state of the vehicle is the case that a charge remaining amount of the electric storage device is less than a predetermined remaining amount determination value while an output request amount requested to the engine for charging the electric storage device is equal to or greater than a predetermined output request amount determination value.

The sixth aspect of the invention provides the control device for a vehicle power transmission device, wherein (a) the control device is disposed with an electric storage device charged by an electric generator rotationally driven by the engine and an air conditioner for performing air-conditioning inside the vehicle with output of the engine, and wherein (b) the case of the fuel consumption priority running state of the vehicle is the case that an air-conditioner request power necessary for driving the air conditioner is equal to or greater than a predetermined air-conditioner request power determination value while an output request amount requested to the engine for charging the electric storage device is equal to or greater than the predetermined output request amount determination value.

The seventh aspect of the invention provides the control device for a vehicle power transmission device, wherein if a variation of the request drive force within a predetermined period is equal to or greater than a predetermined request drive force variation determination value, a shift point of the automatic transmission is prohibited from being set in accordance with a rotation speed of the engine and a vehicle speed.

The eighth aspect of the invention provides the control device for a vehicle power transmission device, wherein if a power running mode is manually selected to improve acceleration response during running of a vehicle as compared to when the mode is not selected, a shift point of the automatic transmission is prohibited from being set in accordance with a rotation speed of the engine and a vehicle speed.

The ninth aspect of the invention provides the control device for a vehicle power transmission device, wherein the control device is disposed with an electric differential portion including a differential mechanism coupled between the engine and the automatic transmission, a first electric motor coupled to the differential mechanism in a power transmittable manner, and a second electric motor coupled to the drive wheel in a power transmittable manner with the differential state of the differential mechanism controlled by controlling an operating state of the first electric motor.

Preferably, (a) the differential mechanism is a planetary gear device having a first rotating element, a second rotating element, and a third rotating element and (b) the first rotating element is coupled to the engine; the second rotating element is coupled to the first electric motor; and the third rotating element is coupled to the second electric motor and the input rotating member of the automatic transmission.

Preferably, the automatic transmission is shifted by switching one shift stage to another shift stage out of a plurality of shift stages mechanically set in advance with gear ratios different from each other. The automatic transmission is shifted by changing the gripped engagement elements included in the automatic transmission.

The Effects of the Invention

According to the invention recited in the first aspect of the invention, although the control device in the invention basically sets the shift points (shift lines) of the automatic shifting in accordance with the driver request drive force and the vehicle speed, if the vehicle is in the fuel consumption priority running state, the control device sets the shift points (shift lines) of the automatic shifting in accordance with the engine rotation speed and the vehicle speed instead of the driver request drive force. Therefore, whether the shift should be executed can immediately be determined when the engine operation point is changed even if the driver request drive force is not changed, and the shift can be executed to establish a gear stage of the automatic shifting having a higher transmission efficiency of the vehicle power transmission device as compared to the case that the shift points are always set in accordance with the driver request drive force and the vehicle speed. As a result, the improvement of fuel consumption can be achieved by improving the transmission efficiency in the case of the fuel consumption priority running state in which the improvement of fuel consumption should be prioritized.

Since the shift points of the automatic shifting are set in accordance with the driver request drive force and the vehicle speed if not in the fuel consumption priority running state, a responsive shift of the automatic shifting can be ensured that is capable of immediately responding to a transitional change in the request drive force. The driver request drive force is a drive force requested to the vehicle by the driver and, therefore, actually corresponds to the accelerator opening degree etc. Therefore, the driver request drive force may be considered as a superordinate concept of a variation such as the accelerator opening degree indicative of the request drive force.

According to the invention recited in the second aspect of the invention, since the case of the fuel consumption priority running state of the vehicle is the case that the fuel consumption priority running mode is manually selected to improve the fuel consumption as compared to when the mode is not selected, an appropriate shift of the automatic shifting is executed so as to improve fuel consumption in the running mode in which the improvement of fuel consumption of the vehicle should be prioritized.

According to the invention recited in the third aspect of the invention, (a) the control device is disposed with an electric storage device charged by an electric generator rotationally driven by the engine, and (b) since the case of the fuel consumption priority running state of the vehicle is the case that the output request amount requested to the engine for charging the electric storage device is equal to or greater than the predetermined output request amount determination value, if the transmission efficiency of the vehicle power transmission device can be improved by a shift of the automatic shifting, an appropriate shift of the automatic shifting can be executed so as to improve fuel consumption through the improvement of the transmission efficiency.

According to the invention recited in the fourth aspect of the invention, since the case of the fuel consumption priority running state of the vehicle is the case that the remaining amount of fuel to be supplied to the engine is less than the predetermined fuel remaining amount determination value, if it is necessary to prioritize the improvement of fuel consumption over the acceleration response etc., of the vehicle, an appropriate shift of the automatic shifting is executed so as to improve fuel consumption.

According to the invention recited in the fifth aspect of the invention, (a) the control device is disposed with an electric storage device charged by an electric generator rotationally driven by the engine, and (b) since the case of the fuel consumption priority running state of the vehicle is the case that the charge remaining amount of the electric storage device is less than the predetermined remaining amount determination value while the output request amount requested to the engine for charging the electric storage device is equal to or greater than the predetermined output request amount determination value, if it is necessary to prioritize the improvement of fuel consumption over the acceleration response etc., of the vehicle and the transmission efficiency of the vehicle power transmission device can be improved by a shift of the automatic shifting, an appropriate shift of the automatic shifting can be executed so as to improve fuel consumption through the improvement of the transmission efficiency.

According to the invention recited in the sixth aspect of the invention, (a) the control device is disposed with an electric storage device charged by an electric generator rotationally driven by the engine and an air conditioner performs air-conditioning inside the vehicle with output of the engine, and (b) since the case of the fuel consumption priority running state of the vehicle is the case that the air-conditioner request power necessary for driving the air conditioner is equal to or greater than the predetermined air-conditioner request power determination value while the output request amount requested to the engine for charging the electric storage device is equal to or greater than the predetermined output request amount determination value, if the transmission efficiency of the vehicle power transmission device can be improved by a shift of the automatic shifting, an appropriate shift of the automatic shifting can be executed so as to improve fuel consumption through the improvement of the transmission efficiency.

According to the invention recited in the seventh aspect of the invention, if a variation of the request drive force within a predetermined period is equal to or greater than a predetermined request drive force variation determination value, a shift point of the automatic shifting is prohibited from being set in accordance with a rotation speed of the engine and a vehicle speed. As a result, the shift points of the automatic shifting are set in accordance with the driver request drive force and the vehicle speed. If the request drive force variation is large, it is thought that the acceleration-responsive running of the vehicle is necessary to be realized as compared to the case that the driver request drive force is hardly changed. Therefore, if the acceleration-responsive running of the vehicle is emphasized, a responsive shift of the automatic shifting can be ensured that is capable of immediately responding to a transitional change in the request drive force.

According to the invention recited in the second aspect of the invention, if a variation of the request drive force within a predetermined period is equal to or greater than a predetermined request drive force variation determination value, a shift point of the automatic shifting is prohibited from being set in accordance with a rotation speed of the engine and a vehicle speed. As a result, the shift points of the automatic shifting are set in accordance with the driver request drive force and the vehicle speed. Therefore, if the acceleration-responsive running of the vehicle is emphasized, a responsive shift of the automatic shifting can be ensured that is capable of immediately responding to a transitional change in the request drive force.

Since the invention recited in the ninth aspect of the invention is disposed with the electric differential portion including the differential mechanism coupled between the engine and the automatic shifting, the first electric motor coupled to the differential mechanism in a power transmittable manner, and the second electric motor coupled to the drive wheels in a power transmittable manner with the differential state of the differential mechanism controlled by controlling the operating state of the first electric motor, the automatic shifting is a stepped transmission varying the gear ratio step-by-step and can also be caused to function as a stepless transmission capable of continuously varying the gear ratio for the vehicle power transmission device as a whole by controlling the differential state of the differential mechanism.

Preferably, the fuel consumption priority running mode is the running mode of prioritizing the running performance of the vehicle over the fuel consumption.

Preferably, the driver request drive force corresponds to the accelerator opening degree that is an amount of an accelerator pedal operation, and which becomes larger as the accelerator opening degree increases.

Preferably, the air conditioner has a compressor that is rotationally driven by the output of the engine to compress a refrigerant.

MODE FOR CARRYING OUT THE INVENTION

An embodiment of the present invention will now be described in detail with reference to the drawings.

Embodiment

Figure 1:
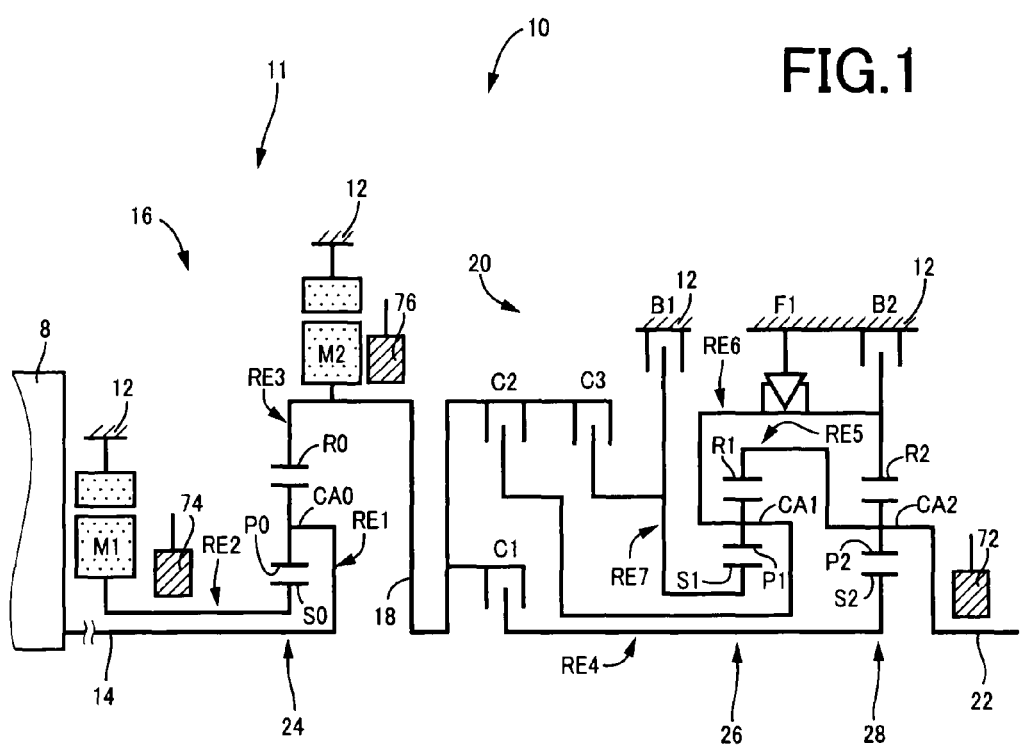
FIG. 1 is a schematic for explaining a vehicle power transmission device to which a control device of the present invention is applied.

FIG. 1 is a schematic for explaining a vehicle power transmission device 10 (hereinafter, the "power transmission device 10") to which a control device of the present invention is applied and the power transmission device 10 is preferably used with a hybrid vehicle. In FIG. 1, the power transmission device 10 includes, in series, an input shaft 14 as an input rotating member disposed on a common shaft center in a transmission case 12 (hereinafter, the "case 12") that is a non-rotating member attached to a vehicle body; a differential portion 11 as a stepless shifting portion coupled to the input shaft 14 directly or indirectly via a pulsation absorbing damper (pulsation damping device) not depicted; an automatic shifting portion 20 as a power transmitting portion serially coupled via a transmitting member 18 on a power transmission path between the differential portion 11 and drive wheels 34 (see FIG. 5); and an output shaft 22 as an output rotating member coupled to the automatic shifting portion 20. The power transmission device 10 is preferably used for, for example, an FR (front-engine rear-drive) type vehicle with the power transmission device 10 longitudinally placed in a vehicle 6 (see FIG. 5), and is disposed between an engine 8 that is, for example, an internal combustion engine such as a gasoline engine or a diesel engine as a power source for running coupled to the input shaft 14 directly via the pulsation absorbing damper not depicted and a pair of the drive wheels 34 to transmit the power from the engine 8 sequentially through a differential gear device (final reduction device) 32 (see FIG. 5) making up a portion of the power transmission path and a pair of axles etc., to a pair of the drive wheels 34.

In the power transmission device 10 of this embodiment, the engine 8 is directly coupled to the differential portion 11. This direct coupling means that the coupling is achieved without the intervention of a fluid type power transmission device such as a torque converter or a fluid coupling and this coupling includes, for example, the coupling through the pulsation absorbing damper. The power transmission device 10 is symmetrically configured relative to the shaft center and, therefore, the lower half is not depicted in the schematic of FIG. 1.

The differential portion 11 is an electric differential portion that includes a power distribution mechanism 16, a first electric motor M1 coupled to the power distribution mechanism 16 in a power transmittable manner to act as a differential electric motor for controlling the differential state of the power distribution mechanism 16, and a second electric motor M2 coupled to the transmitting member 18 in a power transmittable manner so as to rotate integrally therewith. The transmitting member 18 is an output rotating member of the differential portion 11 and also corresponds to an input rotating member of the automatic shifting portion 20.

The first electric motor M1 and the second electric motor M2 are so-called motor generators that have a function as a motor generating a mechanical drive force from electric energy and a function as an electric generator generating electric energy from a mechanical drive force. In other words, in the power transmission device 10, an electric motors M may act as a substitution for the engine 8, which is a main power source, or as a power source (sub-power source) that generates a drive force for running along with the engine 8. The electric motor M also performs operations such as generating electric energy through regeneration from a drive force generated by another power source to supply another electric motor M through an inverter 54 (see FIG. 5) or to charge an electric storage device 56 (see FIG. 5) with the electric energy.

The first electric motor M1 at least includes a generator (electric generation) function for generating a reaction force. The second electric motor M2 is coupled to the drive wheels 34 in a power transmittable manner and at least includes a motor (electric motor) function for acting as a running electric motor that outputs a drive force as a second drive force source for running. Preferably, the first electric motor M1 and the second electric motor M2 are both configured to be capable of continuously changing the electric power generation amount as electric generators. The first electric motor M1 and the second electric motor M2 are included in the case 12 that is a housing of the power transmission device 10 and is cooled by the operating oil of the automatic transmitting portion 20, which is an operating fluid of the power transmission device 10.

The power distribution mechanism 16 is a differential mechanism coupled between the engine 8 and the automatic shifting portion 20, is made up mainly of a single pinion type differential-portion planetary gear device 24 having a predetermined gear ratio $\rho 0$ on the order of "0.416", for example, and is a mechanical mechanism that mechanically distributes the output of engine 8 input to the input shaft 14. The differential-portion planetary gear device 24 includes a differential-portion sun gear S0, a differential-portion planetary gear P0, a differential-portion carrier CA0 that supports the differential-portion planetary gear P0 in a rotatable and revolvable manner, and a differential-portion ring gear R0 engaging via the differential-portion planetary gear P0 with the differential-portion sun gear S0, as rotating elements (elements). When ZS0 denotes the number of teeth of the differential-portion sun gear S0 and ZR0 denotes the number of teeth of the differential-portion ring gear R0, the gear ratio $\rho 0$ is ZS0/ZR0.

In this power distribution mechanism 16, the differential-portion carrier CA0 is coupled to the input shaft 14, i.e., the engine 8; the differential-portion sun gear S0 is coupled to the first electric motor M1; and the differential-portion ring gear R0 is coupled to the transmitting member 18. The power distribution mechanism 16 configured as described above is put into a differential enabled state (differential state) where a differential action is made operative, i.e., the differential action is achieved by enabling the three elements of the differential-portion planetary gear device 24, i.e., the differential-portion sun gear S0, the differential-portion carrier CA0, and the differential-portion ring gear R0 to rotate relative to each other and, therefore, the output of the engine 8 is distributed to the first electric motor M1 and the transmitting member 18, and since the electric energy generated by the first electric motor M1 from a portion of the distributed output of the engine 8 is accumulated and used for rotationally driving the second electric motor M2, the differential potion 11 (the power distribution mechanism 16) is allowed to function as an electric differential device and, for example, the differential potion 11 is put into a so-called stepless shifting state (electric CVT state), and the rotation of the transmitting member 18 is continuously varied regardless of a predetermined rotation of the engine 8. Therefore, when the power distribution mechanism 16 is put into the differential state, the differential portion 11 is also put into the differential state, and the differential portion 11 is put into the stepless shifting state to function as an electric stepless transmission with a gear ratio $\gamma 0$ (rotation speed $N_{IN}$ of the input shaft 14/rotation speed $N_{18}$ of the transmitting member 18) continuously varied from a minimum value $\gamma 0min$ to a maximum value $\gamma 0max$. When the power distribution mechanism 16 is put into the differential state in this way, the operating state (operation point) is controlled in one or both of the first electric motor M1 and the second electric motor M2 coupled to the power distribution mechanism 16 (the differential portion 11) in a power transmittable manner, thereby controlling the differential state of the power distribution mechanism 16, i.e., the differential state of the rotation speed of the input shaft 14 and the rotation speed of the transmitting member 18. In this embodiment, as can be seen from FIG. 1, the rotation speed $N_{IN}$ of the input shaft 14 (hereinafter, "input shaft rotation speed $N_{IN}$") is the same rotation speed as the engine rotation speed $N_E$.

The automatic shifting portion 20 corresponding to the automatic transmission of the present invention includes a single pinion type first planetary gear device 26 and a single pinion type second planetary gear device 28, makes up a portion of the power transmission path between the engine 8 and the drive wheels 34, and is a planetary-gear type multi-stage transmission acting as a stepped automatic transmission with a plurality of gear ratios mechanically set in a stepwise manner. The first planetary gear device 26 includes a first sun gear S1, a first planetary gear P1, a first carrier CA1 that supports the first planetary gear P1 in a rotatable and revolvable manner, and a first ring gear R1 engaging via the first planetary gear P1 with the first sun gear S1 and has a predetermined gear ratio ρ1 on the order of "0.488", for example. The second planetary gear device 28 includes a second sun gear S2, a second planetary gear P2, a second carrier CA2 that supports the second planetary gear P2 in a rotatable and revolvable manner, and a second ring gear R2 engaging via the second planetary gear P2 with the second sun gear S2 and has a predetermined gear ratio ρ2 on the order of "0.455", for example. When ZS1, ZR1, ZS2, and ZR2 respectively denote the number of teeth of the first sun gear S1, the number of teeth of the first ring gear R1, the number of teeth of the second sun gear S2, and the number of teeth of the second ring gear R2, the gear ratio ρ1 is ZS1/ZR1 and the gear ratio ρ2 is ZS2/ZR2.

In the automatic shifting portion 20, the first sun gear S1 is coupled via a third clutch C3 to the transmitting member 18 and is selectively coupled via a first brake B1 to the case 12; the first carrier CA1 and the second ring gear R2 are integrally coupled to each other, are coupled via a second clutch C2 to the transmitting member 18, and are selectively coupled via a second brake B2 to the case 12; the first ring gear R1 and the second carrier CA2 are integrally coupled to each other and are coupled to the output shaft 22; and the second sun gear S2 is selectively coupled via a first clutch C1 to the transmitting member 18. The first carrier CA1 and the second ring gear R2 are coupled via a unidirectional clutch F1 to the case 12 that is a non-rotating member to allow rotation in the same direction as the engine 8 and to prohibit rotation in the opposite direction. As a result, the first carrier CA1 and the second ring gear R2 act as rotating members unable to rotate reversely.

In the automatic shifting portion 20 configured as described above, for example, a clutch-to-clutch shift is executed by the release of release-side engagement devices and the engagement of engagement-side engagement devices and a plurality of gear stages (shift stages) are selectively established to acquire a gear ratio γ$_{AT}$ (=rotation speed N$_{18}$ of the transmitting member 18/rotation speed N$_{OUT}$ of the output shaft 22) varying in substantially equal ratio for each gear stage. For example, as depicted in an engagement operation table of FIG. 2, a first speed gear stage with a gear ratio on the order of "3.20" is established by the engagement of the first clutch C1 and the unidirectional clutch F1; a second speed gear stage with a gear ratio on the order of "1.72" is established by the engagement of the first clutch C1 and the first brake B1; a third speed gear stage with a gear ratio on the order of "1.00" is established by the engagement of the first clutch C1 and the second clutch C2; a fourth speed gear stage with a gear ratio on the order of "0.67" is established by the engagement of the second clutch C2 and the first brake B1; and a reverse gear stage with a gear ratio on the order of "2.04" is established by the engagement of the third clutch C3 and the second brake B2. A neutral "N" state is achieved by the release of the first clutch C1, the second clutch C2, the third clutch C3, the first brake B1, and the second brake B2. At the time of engine braking in the first speed gear stage, the second brake B2 is engaged.

The power transmission path in the automatic shifting portion 20 is switched between a power transmittable state that enables the power transmission through the power transmission path and a power transmission interrupted state that interrupts the power transmission in accordance with a combination of the engagement and release operations of the first clutch C1, the second clutch C2, the third clutch C3, the first brake B1, and the second brake B2. When any one of the first to fourth speed gear stages and the reverse gear stage is established, the power transmission path is put into the power transmittable state and when no gear stage is established, for example, when the neutral "N" state is established, the power transmission path is put into the power transmission interrupted state.

The first clutch C1, the second clutch C2, the third clutch C3, the first brake B1, and the second brake B2 (hereinafter, simply, clutches C and brakes B if not particularly distinguished) are hydraulic friction engagement devices acting as engagement elements frequently used in conventional vehicle automatic transmissions and are made up as a wet multi-plate type having a hydraulic actuator pressing a plurality of friction plates overlapped with each other or as a band brake or the like having a hydraulic actuator fastening one end of one or two bands wrapped around an outer peripheral surface of a rotating drum, for the purpose of selectively coupling members on the both sides of the devices interposed therebetween.

In the power transmission device 10 configured as described above, a stepless transmission is made up of the differential portion 11 functioning as a stepless transmission and the automatic shifting portion 20 in total. The differential portion 11 and the automatic shifting portion 20 can form the state equivalent to a stepped transmission by providing control such that the gear ratio of the differential portion 11 is kept constant.

Specifically, when the differential portion 11 functions as a stepless transmission and the automatic shifting portion 20 in series with the differential portion 11 functions as a stepped transmission, the rotation speed input to the automatic shifting portion 20 (hereinafter, "input rotation speed of the automatic shifting portion 20"), i.e., the rotation speed of the transmitting member 18 (hereinafter, "transmitting member rotation speed N$_{18}$") is varied in a stepless manner for at least one shift stage M of the automatic shifting portion 20, and a stepless gear ratio width is acquired in the shift stage M. Therefore, a general gear ratio γT (=input shaft rotation speed N$_{IN}$/rotation speed N$_{OUT}$ of the output shaft 22) of the power transmission device 10 is acquired in a stepless manner and a stepless transmission is formed in the power transmission device 10. The general gear ratio γT of the power transmission device 10 is a total gear ratio γT of the entire power transmission device 10 generated based on the gear ratio γ0 of the differential portion 11 and the gear ratio γ$_{AT}$ of the automatic shifting portion 20. For example, the transmitting member rotation speed N$_{18}$ is varied in a stepless manner for each gear stage of the first to fourth speed gear stages and the reverse gear stage of the automatic shifting portion 20 described in the engagement operation table of FIG. 2 and a stepless gear ratio width is acquired in each gear stage. Therefore, a gear ratio continuously variable in a stepless manner is achieved between the gear stages and the total gear ratio γT is acquired in a stepless manner for the entire power transmission device 10.

When the gear ratio of the differential portion 11 is controlled to be kept constant and the clutches C and the brakes B are selectively engaged and actuated to selectively establish any one of the first to fourth speed gear stages or the reverse gear stage (reverse shift stage), the total gear ratio γT of the power transmission device 10 varying in substantially equal ratio is acquired for each gear stage. Therefore, the state equivalent to a stepped transmission is formed in the power transmission device 10.

Figures 2, 3:
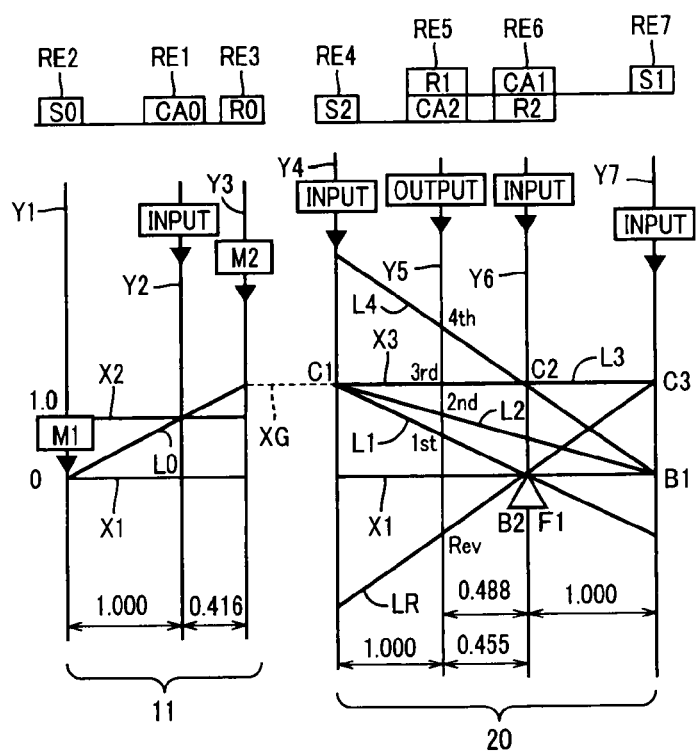
FIG. 2 is an engagement operation table for explaining a relationship between the shift operation of the automatic shifting portion included in the vehicle power transmission device of the FIG. 1 and the combination of the operation of the hydraulic friction engagement devices used thereof.
FIG. 3 is a collinear diagram for explaining the relative rotation speed for the gear stages in the vehicle power transmission device of the FIG. 1.

FIG. 3 is a collinear diagram capable of representing on straight lines the relative relationships of the rotation speeds of the rotating elements having a different coupling state for each gear stage in the power transmission device 10 made up of the differential portion 11 acting as a stepless shifting portion or a first shifting portion, and the automatic shifting portion 20 acting as a stepped shifting portion or a second shifting portion. The collinear diagram of FIG. 3 represents two-dimensional coordinates defined by a horizontal axis indicative of a relationship of the gear ratios ρ of the planetary gear devices 24, 26, and 28 and a vertical axis indicative of a relative rotation speed and, a lower horizontal line X1 of three horizontal lines indicates a zero rotation speed; an upper horizontal line X2 indicates a rotation speed "1.0", i.e., a rotation speed $N_E$ of the engine 8 coupled to the input shaft 14 (hereinafter, "engine rotation speed $N_E$"); and a horizontal line XG (X3) indicates a rotation speed $N_{18}$ of the transmitting member 18, i.e., a rotation speed of a third rotating element RE3 described later input from the differential portion 11 to the automatic shifting portion 20.

Three vertical lines Y1, Y2, and Y3 corresponding to the three elements of the power distribution mechanism 16 making up the differential portion 11 indicate relative rotation speeds of the differential-portion sun gear S0 corresponding to a second rotating element (second element) RE2, the differential-portion carrier CA0 corresponding to a first rotating element (first element) RE1, and the differential-portion ring gear R0 corresponding to the third rotating element (third element) RE3 in the order from left to right, and the intervals thereof are determined depending on the gear ratio ρ0 of the differential-portion planetary gear device 24. Four vertical lines Y4, Y5, Y6, and Y7 of the automatic shifting portion 20 respectively represent the second sun gear S2 corresponding to a fourth rotating element (fourth element) RE4, the first ring gear R1 and the second carrier CA2 mutually-coupled and corresponding to a fifth rotating element (fifth element) RE5, the first carrier CA1 and the second ring gear R2 mutually-coupled and corresponding to a sixth rotating element (sixth element) RE6, and the first sun gear S1 corresponding to a seventh rotating element (seventh element) RE7 in the order from left to right, and the intervals thereof are determined depending on the gear ratios ρ1 and ρ2 of the first and second planetary gear devices 26 and 28 respectively. In the relationship between the vertical axes of the collinear diagram, when an interval corresponding to "1" is defined between a sun gear and a carrier, an interval corresponding to the gear ratio ρ of a planetary gear device is defined between the carrier and a ring gear. Therefore, in the case of the differential portion 11, the interval corresponding to "1" is set between the vertical lines Y1 and Y2, and the interval between the vertical lines Y2 and Y3 is set to the interval corresponding to the gear ratio ρ0. In the case of the automatic shifting portion 20, the interval corresponding to "1" is set between the sun gear and the carrier of each of the first and second planetary gear devices 26 and 28, and the interval corresponding to ρ is set between the carrier and the ring gear.

When the power transmission device 10 of this embodiment is represented by using the collinear diagram of FIG. 3, the first rotating element RE1 (the differential-portion carrier CA0) of the differential-portion planetary gear device 24 is coupled to the input shaft 14, i.e., the engine 8 in the power distribution mechanism 16 (the differential portion 11); the second rotating element RE2 is coupled to the first electric motor M1; and the third rotating element (the differential-portion ring gear R0) RE3 is coupled to the transmitting member 18 and the second electric motor M2 such that the rotation of the input shaft 14 is transmitted (input) via the transmitting member 18 to the automatic shifting portion 20. A diagonal straight line L0 passing through the intersection point of Y2 and X2 indicates the relationship between the rotation speed of the differential-portion sun gear S0 and the rotation speed of the differential-portion ring gear R0.

For example, the differential portion 11 is put into a differential state where the first rotating element RE1 to the third rotating element RE3 are enabled to rotate relative to each other and, if the rotation speed of the differential-portion ring gear R0 indicated by the intersecting point between the line L0 and the vertical line Y3 is restricted and kept substantially constant by the vehicle speed V, when the rotation speed of the first electric motor M1 is controlled to increase or decrease the rotation of the differential-portion sun gear S0 indicated by the intersecting point between the line L0 and the vertical line Y1, the rotation speed of the differential-portion carrier CA0 indicated by the intersecting point between the line L0 and the vertical line Y2, i.e., the engine rotation speed $N_E$ is increased or decreased. When the rotation speed of the first electric motor M1 is controlled such that the gear ratio γ0 of the differential portion 11 is fixed to "1" to set the rotation of the differential-portion sun gear S0 to the same rotation as the engine rotation speed $N_E$, the line L0 is matched to the horizontal line X2, and the rotation speed of the differential-portion ring gear R0, i.e., the transmitting member 18 is rotated at the same rotation as the engine rotation speed $N_E$. Alternatively, when the rotation speed of the first electric motor M1 is controlled such that the gear ratio γ0 of the differential portion 11 is fixed to a value smaller than "1", for example, about 0.7 to set the rotation of the differential-portion sun gear S0 to zero, the line L0 is put into the state depicted in FIG. 3, and the transmitting member 18 is rotated at a speed increased from the engine rotation speed $N_E$.

In the automatic shifting portion 20, the fourth rotating element RE4 is selectively coupled to the transmitting member 18 via the first clutch C1; the fifth rotating element RE5 is coupled to the output shaft 22; the sixth rotating element RE6 is selectively coupled via the second clutch C2 to the transmitting member 18 and also selectively coupled via the second brake B2 to the case 12; and the seventh rotating element RE7 is selectively coupled via the third clutch C3 to the transmitting member 18 and also selectively coupled via the first brake B1 to the case 12.

In the automatic shifting portion 20, as depicted in FIG. 3, when the first clutch C1 and the second brake B2 are engaged, the rotation speed of the output shaft 22 at a first speed (1st) is indicated by the intersecting point between a diagonal straight line L1 that passes through the intersecting point between the vertical line Y4 indicative of the rotation speed of the fourth rotating element RE4 and the horizontal line X3 and the intersecting point between the vertical line Y6 indicative of the rotation speed of the sixth rotating element RE6 and the horizontal line X1, and the vertical line Y5 indicative of the rotation speed of the fifth rotating element RE5 coupled to the output shaft 22. Similarly, the rotation speed of the output shaft 22 at a second speed (2nd) is indicated by the intersecting point between a diagonal straight line L2 determined by engaging the first clutch C1 and the first brake B1 and the vertical line Y5 indicative of the rotation speed of the fifth rotating element RE5 coupled to the output shaft 22; the rotation speed of the output shaft 22 at a third speed (3rd) is indicated by the intersecting point between a horizontal straight line L3 determined by engaging the first clutch C1 and the second clutch C2 and the vertical line Y5 indicative of the rotation speed of the fifth rotating element RE5 coupled to the output shaft 22; and the rotation speed of the output shaft 22 at a fourth speed (4th) is indicated by the intersecting point between a diagonal straight line L4 determined by engaging the second clutch C2 and the first brake B1 and the vertical line Y5 indicative of the rotation speed of the fifth rotating element RE5 coupled to the output shaft 22.

The vehicle 6 of this embodiment includes an air conditioner 42. This air conditioner 42 is a generally known car air conditioner that uses the output of the engine 8 to perform air-conditioning inside the vehicle. Specifically, the air conditioner 42 has a compressor 43 rotationally driven by the output of the engine 8 to compress a refrigerant and performs the air-conditioning inside the vehicle through the refrigerant. When the air conditioner 42 is turned on, the operation point of the engine 8 is changed toward higher output for rotationally driving the compressor 43 and the engine rotation speed $N_E$ is raised as compared to the OFF state of the air conditioner 42, for example, even if no change occurs in the running load.

Figure 4:
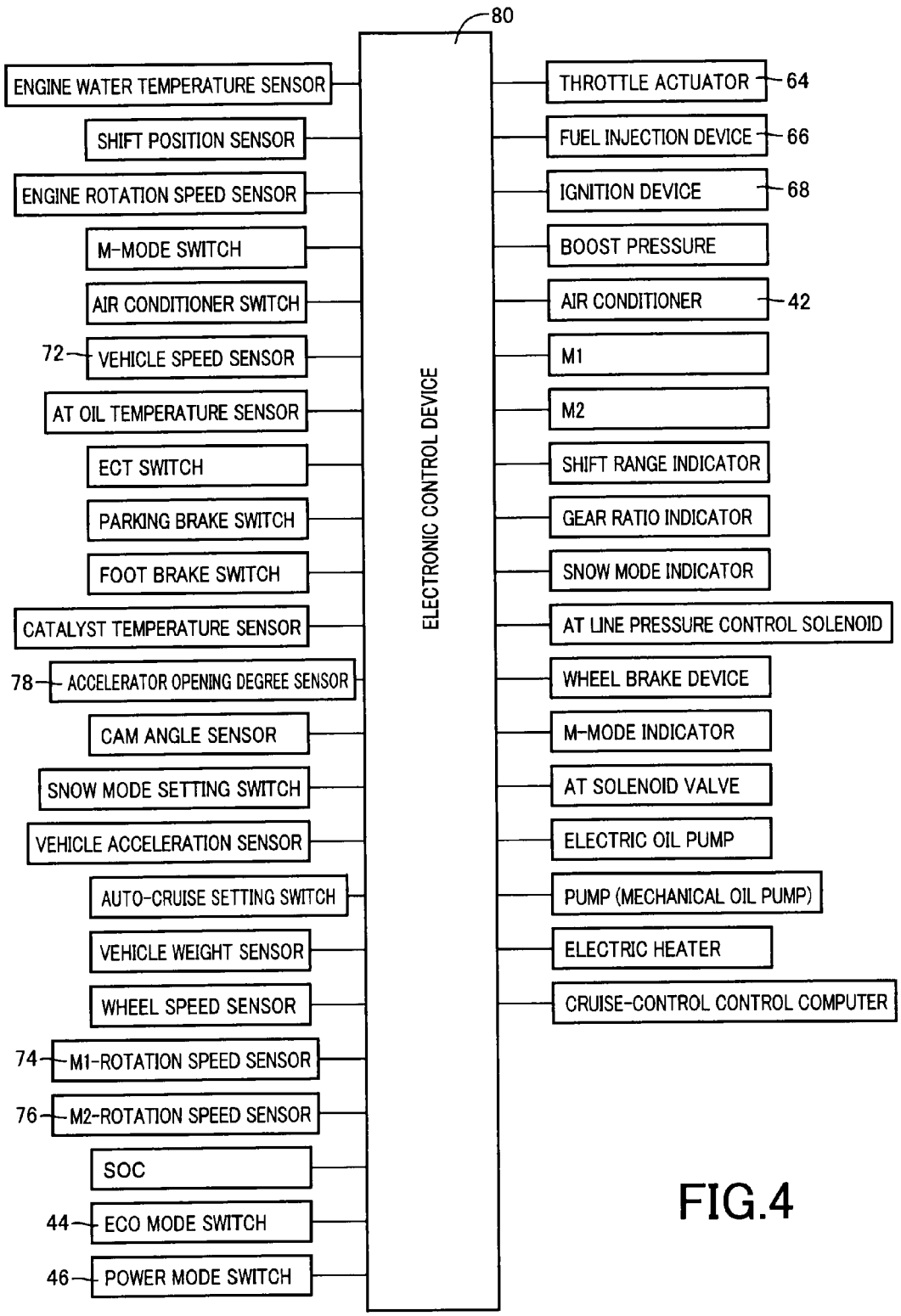
FIG. 4 is a diagram for explaining signals input to an electronic control device for controlling the vehicle power transmission device of FIG. 1 and signals output from the electronic control device.

FIG. 4 exemplarily illustrates signals input to an electronic control device 80 that is a control device for controlling the power transmission device 10 of this embodiment and signals output from the electronic control device 80. The electronic control device 80 includes a so-called microcomputer consisting of CPU, ROM, RAM, I/O interface, etc., and executes signal processes in accordance with programs stored in advance in the ROM, while utilizing a temporary storage function of the RAM, to provide various controls such as the hybrid drive control related to the engine 8 and the electric motors M and the shift control of the automatic shifting portion 20.

The electronic control device 80 is supplied, from sensors, switches, etc., as depicted in FIG. 4, with a signal indicative of an engine water temperature $TEMP_W$ that is a temperature of a refrigeration fluid of the engine 8, signals indicative of a shift position $P_{SH}$ of a shift lever operated by a driver and the number of operations at an "M" position that is a manual shift running position, a signal indicative of the engine rotation speed $N_E$; a signal giving a command for an M-mode (manual shift running mode), a signal indicative of the operation of the air conditioner 42, signals indicative of a vehicle speed V and a running direction of the vehicle 6 corresponding to the rotation speed $N_{OUT}$ (hereinafter, "output shaft rotation speed $N_{OUT}$") of the output shaft 22 detected by a vehicle speed sensor 72, a signal indicative of an operating oil temperature $T_{OIL}$ of the automatic shifting portion 20, a signal indicative of a parking brake operation, a brake operation signal indicative of a brake pedal operation (ON) $B_{ON}$ indicating that a foot brake device (wheel brake device) is being activated (i.e., a foot brake is being operated) that is well-known as a brake device applying a brake torque to wheels (the drive wheels 34, driven wheels not depicted), a signal indicative of a catalyst temperature, an accelerator opening degree signal indicative of an accelerator opening degree $A_{CC}$ that is an amount of an accelerator pedal operation corresponding to a driver request drive force $F_R$ detected by an accelerator opening degree sensor 78, a signal indicative of a cam angle, a signal indicative of a snow mode setup, a signal indicative of longitudinal acceleration G of the vehicle 6, a signal indicative of autocruise running, a signal indicative of a weight of the vehicle 6 (vehicle weight), a signal indicative of a wheel speed for each of wheels, a signal indicative of a rotation speed $N_{M1}$ (hereinafter, "first electric motor rotation speed $N_{M1}$") of the first electric motor M1 and the rotation direction thereof detected by an M1 rotation speed sensor 74 consisting of a resolver etc., a signal indicative of a rotation speed $N_{M2}$ (hereinafter, "second electric motor rotation speed $N_{M2}$") of the second electric motor M2 and the rotation direction thereof detected by an M2 rotation speed sensor 76 consisting of a resolver etc., a signal indicative of a charge remaining amount (state of charging) SOC of the electric storage device 56 (see FIG. 5) charged and discharging through the inverter 54 between the electric motors M1 and M2, a signal indicating a battery temperature $TH_{BAT}$ of the electric storage device (battery) 56, a signal indicating that a fuel consumption priority running mode switch (eco mode switch) 44 is operated that is manually operated for selecting a fuel consumption priority running mode (eco mode) improving the fuel consumption as compared to when the mode is not selected, a signal indicating that a power running mode switch (power mode switch) 46 is operated that is manually operated for selecting a power running mode (power mode) improving the acceleration response during running of a vehicle as compared to when the mode is not selected, etc.

The electronic control device 80 outputs control signals to an engine output control device 58 (see FIG. 5) that controls output $P_E$ of the engine 8 (e.g., in "kW"; hereinafter, "engine output $P_E$"), for example, a drive signal to a throttle actuator 64 that operates a throttle valve opening degree $\theta_{TH}$ of an electronic throttle valve 62 disposed in an intake pipe 60 of the engine 8, a fuel supply amount signal that controls a fuel supply amount into the intake pipe 60 or the cylinders of the engine 8 from a fuel injection device 66, an ignition signal that gives a command for the timing of the ignition of the engine 8 by an ignition device 68, a boost pressure adjusting signal for adjusting a boost pressure, an air conditioner drive signal for activating the air conditioner 42, command signals that give commands for the operations of the electric motors M1 and M2, a shift position (operational position) display signal for activating a shift indicator, a gear ratio display signal for displaying a gear ratio, a snow mode display signal for displaying that the snow mode is in operation, a wheel brake activation signal for activating a wheel brake, an M-mode display signal for displaying that the M-mode is selected, a valve command signal for activating an electromagnetic valve (solenoid valve) etc., included in a hydraulic control circuit 70 (see FIG. 5) so as to control the hydraulic actuator of the hydraulic friction engagement devices of the differential portion 11 and the automatic shifting portion 20, a signal for regulating a line oil pressure with a regulator valve (pressure regulating valve) disposed in the hydraulic control circuit 70, a drive command signal for activating an electric hydraulic pump that is an oil pressure source of an original pressure for regulating the line oil pressure, a signal for driving an electric heater, a signal to a computer for controlling the cruise control, etc.

Figure 5:
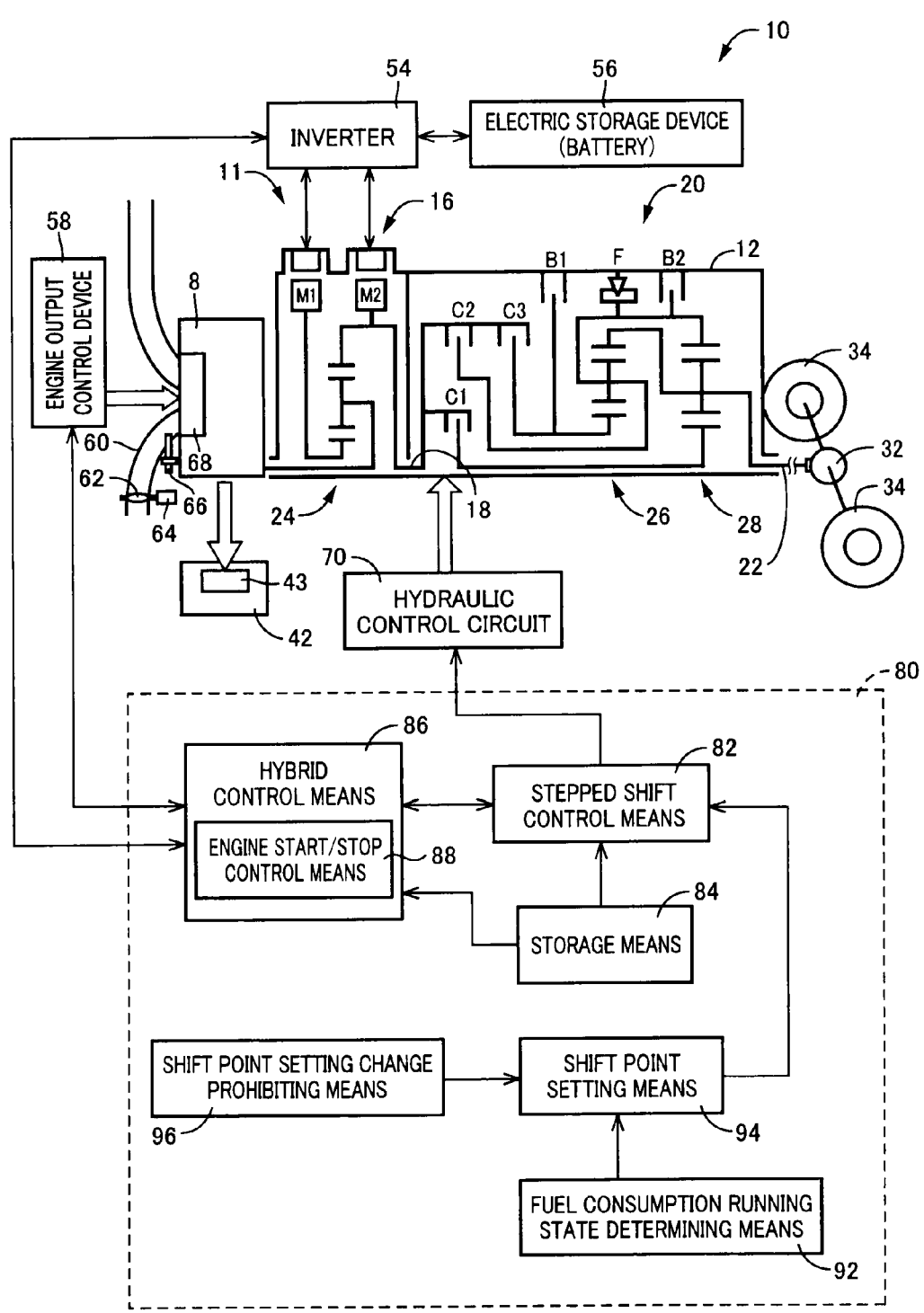
FIG. 5 is a functional block line diagram for explaining a main portion of a control function included in the electronic control device of FIG. 4.
Figure 6:
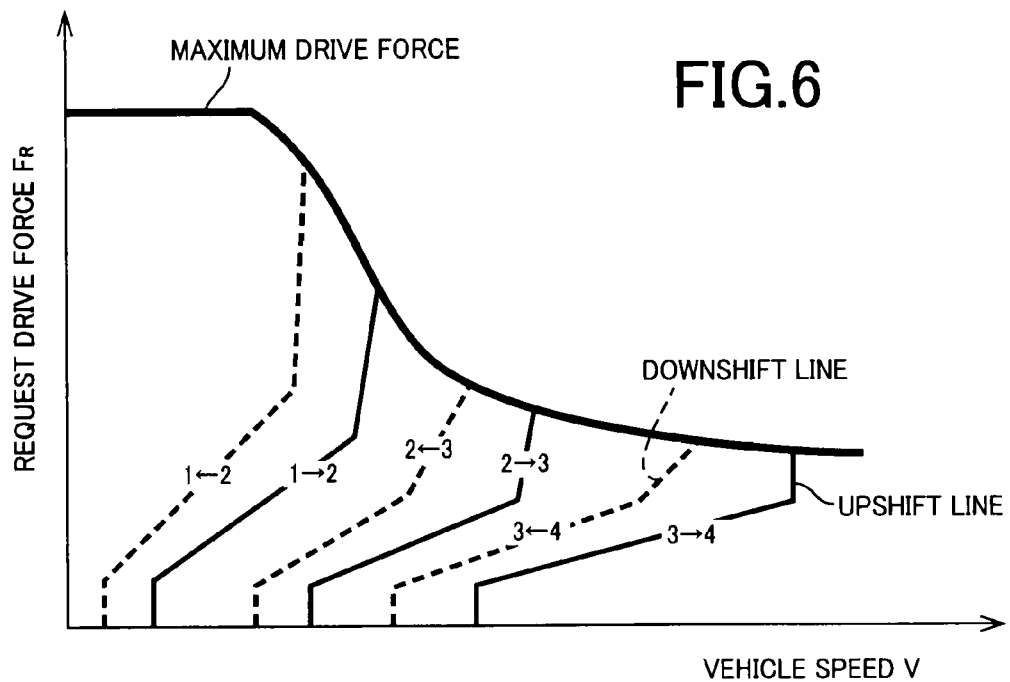
FIG. 6 is a shift line diagram that is using the vehicle speed and the driver request drive force preliminarily stored as parameters, and which are the basis for the shift determination of the automatic shifting portion included in the vehicle power transmission device of the FIG. 1.

FIG. 5 is a functional block line diagram for explaining a main portion of a control function included in the electronic control device 80. In FIG. 5, a stepped shift control portion, i.e., a stepped shift control means 82 functions as a shift control means that executes a shift of the automatic shifting portion 20. The stepped shift control means 82 determines whether a shift of the automatic shifting portion 20 should be executed, i.e., determines a shift stage to be achieved by the shift of the automatic shifting portion 20 based on the vehicle state indicated by an actual vehicle speed V and a request drive force $F_R$ corresponding to the accelerator opening degree $A_{CC}$ etc., in accordance with a relationship (a shift line diagram, a shift map) having upshift lines (solid lines) and downshift lines (broken lines) preliminarily stored in a storage portion, i.e., a storage means 84 using the vehicle speed V and the driver request drive force $F_R$ as parameters as depicted in FIG. 6, and provides the automatic transmission control of the automatic shifting portion 20 so as to acquire the determined shift stage. Describing FIG. 6 in detail, the solid lines of FIG. 6 are shift lines (upshift lines) for determining an upshift and the broken lines are shift lines (downshift lines) for determining a downshift. A shift line in the shift line diagram of FIG. 6 is for the purpose of determining, for example, whether the actual vehicle speed V crosses the horizontal line indicative of the driver request drive force $F_R$ or, for example, whether the driver request drive force $F_R$ crosses the vertical line indicative of the actual vehicle speed V, i.e., whether crossing a value (shift point) at which a shift should be executed on the shift lines, and is stored in advance as a series of these shift points. The driver request drive force $F_R$ is a drive force requested to the vehicle 6 by the driver and, therefore, actually corresponds to the accelerator opening degree $A_{CC}$ etc., and, for example, the driver request drive force $F_R$ becomes larger as the accelerator opening degree $A_{CC}$ increases, and is determined based on the accelerator opening degree $A_{CC}$. Therefore, the driver request drive force $F_R$ may be considered as a superordinate concept of a variation such as the accelerator opening degree $A_{CC}$ indicative of the request drive force $F_R$. For example, the stepped shift control means 82 may determine whether a shift of the automatic shifting portion 20 should be executed, based on a shift line diagram of FIG. 7 using the vehicle speed V and the accelerator opening degree $A_{CC}$ as axial parameters, instead of FIG. 6. The employment of the driver request drive force $F_R$ or the accelerator opening degree $A_{CC}$ as an axial parameter as depicted in the shift line diagram depicted in FIGS. 6 and 7 has an advantage capable of ensuring a responsive shift of the automatic shifting portion 20 capable of immediately responding to a transitional change in the request drive force $F_R$ (the accelerator opening degree $A_{CC}$). Although the stepped shift control means 82 determines whether a shift of the automatic shifting portion 20 should be executed based on a shift line diagram of FIG. 11 instead of the shift line diagram of FIG. 6 or 7 and provides the automatic transmission control of the automatic shifting portion 20 in some cases, this point will be described later.

If the automatic transmission control of the automatic shifting portion 20 is provided, the stepped shift control means 82 gives a command (a shift output command, an oil pressure command) for engaging and/or releasing the hydraulic friction engagement devices involved in the shift of the automatic shifting portion 20 such that the shift stage is achieved in accordance with, for example, the engagement table depicted in FIG. 2, i.e., a command causing the execution of a clutch-to-clutch shift by releasing the release-side engagement devices and engaging the engagement-side engagement devices involved in the shift of the automatic shifting portion 20 to the hydraulic control circuit 70. The hydraulic control circuit 70 activates the linear solenoid valve in the hydraulic control circuit 70 to actuate the hydraulic actuator of the hydraulic friction engagement devices involved in the shift such that the shift of the automatic shifting portion 20 is executed by, for example, releasing the release-side engagement devices and engaging the engagement-side engagement devices in accordance with the command.

A hybrid control portion, i.e., a hybrid control means 86 has a function as an engine drive control means that controls the drive of the engine 8 through the engine output control device 58 and a function as an electric motor operation control means that controls the operations of the first electric motor M1 and the second electric motor M2 as a drive force source or an electric generator through the inverter 54, and provides control of the hybrid drive by the engine 8, the first electric motor M1, and the second electric motor M2 through these control functions.

While operating the engine 8 in an efficient operation range, the hybrid control means 86 changes the drive force distribution between the engine 8 and the second electric motor M2 and the reaction force due to the electric generation by the first electric motor M1 to the optimum state to control the gear ratio γ0 of the differential portion 11 acting as an electric stepless transmission. For example, for a running vehicle speed V at a time point, a target (request) output of the vehicle 6 is calculated from the accelerator opening degree $A_{CC}$ that is the driver request drive force $F_R$ and the vehicle speed V; a necessary total target output is calculated from the target output and a charge request amount of the vehicle 6; and a target engine output (request engine output) $P_{ER}$ is calculated such that the total target output is acquired in consideration of a transmission loss, an accessory load, an assist torque of the second electric motor M2, etc., to control the engine 8 and control the output and the electric generation of the electric motors M so as to achieve the engine rotation speed $N_E$ and the output torque (engine torque) $T_E$ of the engine 8 for acquiring the target engine output $P_{ER}$.

As described above, the general gear ratio γT is a gear ratio of the power transmission device 10 as a whole and is determined by the gear ratio $\gamma_{AT}$ of the automatic shifting portion 20 controlled by the stepped shift control means 82 and the gear ratio γ0 of the differential portion 11 controlled by the hybrid control means 86. Therefore, the hybrid control means 86 and the stepped shift control means 82 act as a shift control means that controls the general gear ratio γT that is a gear ratio of the power transmission device 10 as a whole through the hydraulic control circuit 70, the engine output control device 58, the first electric motor M1, and the second electric motor M2, etc., within a range of the shift range corresponding to a shift position $P_{SH}$.

For example, the hybrid control means 86 provides the control of the engine 8 and the electric motors M in consideration of the gear stages of the automatic shifting portion 20 for the purpose of improvements of power performance and fuel consumption. In such hybrid control, the differential portion 11 is driven to function as an electric stepless transmission to match the engine rotation speed $N_E$ determined for operating the engine 8 in an efficient operation range with the rotation speed of the transmitting member 18 determined by the vehicle speed V and the shift stage of the automatic shifting portion 20. Therefore, the storage means 84 preliminarily stores an optimal fuel consumption rate curve (fuel consumption map, relationship) that is a kind of operation curve of the engine 8 as represented by, for example, a solid line $L_{EG}$ of FIG. 10 empirically obtained in advance so as to satisfy both the drivability and the fuel consumption property during running with stepless transmission in the two-dimensional coordinates made up of the engine rotation speed $N_E$ and the engine torque $T_E$; the hybrid control means 86 determines a target value of the total gear ratio γT of the power transmission device 10 such that the engine 8 is operated while an operation point of the engine 8 (hereinafter, the "engine operation point") is moved along the optimal fuel consumption rate curve, for example, such that the engine torque $T_E$ and the engine rotation speed $N_E$ are achieved for generating the engine output $P_E$ necessary for satisfying the target output (total target output, request drive force $F_R$); and the hybrid control means 86 changes the output torque $T_{M1}$ of the first electric motor M1 (hereinafter, the "first electric motor torque") through the feedback control to control the gear ratio γ0 of the differential portion 11 and control the total gear ratio γT within the available variation range so as to acquire the target value. The engine operation point is an operation point indicative of the operation state of the engine 8 in the two-dimensional coordinates with a coordinate axis of a state amount indicative of the operation state of the engine 8 exemplarily illustrated by the engine rotation speed $N_E$ and the engine torque $T_E$, for example. In this embodiment, for example, fuel consumption is a running distance per unit fuel consumption etc., and the improvement of fuel consumption means that the running distance per unit fuel consumption is increased or that a fuel consumption rate (=fuel consumption/drive wheel output) is reduced in a vehicle as a whole. Contrarily, the reduction (deterioration) of fuel consumption means that the running distance per unit fuel consumption is reduced or that a fuel consumption rate is increased in a vehicle as a whole.

In this case, since the hybrid control means 86 supplies the electric energy generated by, for example, the first electric motor M1 through the inverter 54 to the electric storage device 56 and the second electric motor M2, a main portion of the power of the engine 8 (engine output $P_E$) is mechanically transmitted to the transmitting member 18 while a portion of the power of the engine 8 is consumed for the electric generation of the electric motor M and converted into electric energy; the electric energy is supplied through the inverter 54 to the other electric motor M; and a drive force output from the electric motor M due to the electric energy is transmitted to the transmitting member 18. The equipments related to the electric energy from the generation by the electric-generation-related electric motor M to the consumption by the drive-related electric motor make up an electric path from the conversion of a portion of the power of the engine 8 into electric energy to the conversion of the electric energy into mechanical energy. In short, in the differential portion 11, the engine output $P_E$ is transmitted to the transmitting member 18 via two power transmission paths, i.e., a mechanical path of mechanical transmission from the input shaft 14 to the transmitting member 18 and the electric path. The electric storage device 56 is an electric energy source capable of supplying electric power to the first electric motor M1 and the second electric motor M2 and receiving the supply of electric power from the electric motors M1 and M2, and is basically an electric energy source capable of giving/receiving electric power to/from each of the first electric motor M1 and the second electric motor M2. In other words, the electric storage device 56 is an electric energy source charged by one or both of the first electric motor M1 and the second electric motor M2 acting as an electric generator rotationally driven by the engine 8 and is a battery such as a lead storage battery, or a capacitor, for example.

The hybrid control means 86 controls the first electric motor rotation speed $N_{M1}$ and/or the second electric motor rotation speed $N_{M2}$ with the electric CVT function of the differential portion 11 such that the engine rotation speed $N_E$ is maintained substantially constant or rotationally controlled at an arbitrary rotation speed regardless of whether the vehicle 6 is stopped or running. In other words, the hybrid control means 86 can rotationally control the first electric motor rotation speed $N_{M1}$ and/or the second electric motor rotation speed $N_{M2}$ at an arbitrary rotational speed while maintaining or controlling the engine rotation speed $N_E$ substantially constant or at an arbitrary rotation speed.

For example, as can be seen from the collinear diagram of FIG. 3, if the engine rotation speed $N_E$ is raised while a vehicle is running, the hybrid control means 86 raises the first electric motor rotation speed $N_{M1}$ while maintaining the second electric motor rotation speed $N_{M2}$ restricted by the vehicle speed V (the drive wheels 34) substantially constant. If the engine rotation speed $N_E$ is maintained substantially constant during a shift of the automatic shifting portion 20, the hybrid control means 86 changes the first electric motor rotation speed $N_{M1}$ in the direction opposite to the change in the second electric motor rotation speed $N_{M2}$ associated with the shift of the automatic shifting portion 20 while maintaining the engine rotation speed $N_E$ substantially constant.

The hybrid control means 86 outputs commands separately or in combination to the engine output control device 58 to control opening/closing of the electronic throttle valve 62 with the throttle actuator 64 for throttle control, to control a fuel injection amount and an injection timing of the fuel injection device 66 for the fuel injection control, and to control the timing of the ignition by the ignition device 68 such as an igniter for the ignition timing control so as to provide the output control of the engine 8 to generate the necessary engine output $P_E$. Therefore, the hybrid control means 86 functions as an engine drive control means that controls the drive of the engine 8.

For example, the hybrid control means 86 drives the throttle actuator 64 basically based on the accelerator opening degree $A_{CC}$ in accordance with a preliminarily stored relationship not depicted to provide the throttle control such that the throttle valve opening degree $\theta_{TH}$ is increased as the accelerator opening degree $A_{CC}$ increases. The engine output control device 58 provides the engine torque control by controlling opening/closing of the electronic throttle valve 62 with the throttle actuator 64 for the throttle control, controlling the fuel injection by the fuel injection device 66 for the fuel injection control, and controlling the timing of the ignition by, for example, the ignition device 68 such as an igniter for the ignition timing control in accordance with the commands from the hybrid control means 86.

The hybrid control means 86 can achieve the motor running (EV mode running) using, for example, the second electric motor M2 as a running drive force source without using the engine 8 through the electric CVT function (differential action) of the differential portion 11 regardless of whether the engine 8 is stopped or in the idle state. For example, although not depicted, the storage means 84 preliminarily stores a drive force source switching line diagram (drive force source map) made up of an engine running range where so-called engine running is performed by using the engine 8 as a running drive force source for the start/running (hereinafter, running) of the vehicle 6 and a motor running range where so-called motor running is performed by using the second electric motor M2 as a running drive force source for the running of the vehicle 6 in the two-dimensional coordinates using the vehicle speed V and the driver request drive force $F_R$ (accelerator opening degree $A_{CC}$) as variables. The hybrid control means 86 determines either the motor running range or the engine running range to perform the motor running or the engine running based on the vehicle state indicated by the actual vehicle speed V and the driver request drive force $F_R$ from the drive force source switching line diagram stored in the storage means 84. In the drive force source switching line diagram, the motor running range is set in a range with a relatively lower request drive force $F_R$ (relatively lower accelerator opening degree $A_{CC}$), i.e., a lower engine torque $T_E$ zone generally considered as having poor engine efficiency as compared to a higher drive force zone, or during relatively lower vehicle speed of the vehicle speed V, i.e., a lower load zone.

During the motor running, the hybrid control means 86 controls the first electric motor rotation speed $N_{M1}$ at a negative rotation speed to idle the first electric motor M1 in a no-load state, for example, and to maintain the engine rotation speed $N_E$ at zero or substantially zero as needed through the electric CVT function (differential action) of the differential portion 11 so as to suppress the drag of the stopped engine 8 and improve the fuel consumption.

The hybrid control means 86 can provide so-called torque assist for complementing the power of the engine 8 by supplying the electric energy from the first electric motor M1 and/or the electric energy from the electric storage device 56 through the electric path described above to the second electric motor M2 and by driving the second electric motor M2 to apply a torque to the drive wheels 34, even in the engine running range where the engine running is performed by using the engine 8 as a drive force source for running. Therefore, the engine running of this embodiment includes the case of using the engine 8 as the drive force source for running and the case of using both the engine 8 and the second electric motor M2 as the drive force source for running. The motor running of this embodiment is the running while the second electric motor M2 is used as the drive force source for running with the engine 8 stopped.

The hybrid control means 86 includes an engine start/stop control portion, i.e., an engine start/stop control means 88 that switches the operation state of the engine 8 between an operating state and a stopped state, i.e., that starts and stops the engine 8 so as to switch the engine running and the motor running. The engine start/stop control means 88 starts or stops the engine 8 if the hybrid control means 86 determines to make the switch between the motor running and the engine running based on the vehicle state from the drive force source switching line diagram, for example.

For example, if an accelerator pedal is operated and depressed to increase the request drive force $F_R$ and the hybrid control means 86 determines that the vehicle state changes from the motor running range to the engine running range of the drive force source switching line diagram and determines to make the switch from the motor running to the engine running, i.e., the hybrid control means 86 determines to start the engine, the engine start/stop control means 88 applies an electric current to the first electric motor M1 and raises the first electric motor rotation speed $N_{M1}$, i.e., causes the first electric motor M1 to function as a starter to provide the engine rotation drive control that raises the engine rotation speed $N_E$ to a predetermined rotation speed $N_E'$ enabling complete explosion, for example, equal to or greater than a predetermined autonomous rotation speed $N_{EIDL}$ enabling autonomous rotation equal to or greater than the idle rotation speed. When the engine rotation speed $N_E$ is equal to or higher than the predetermined rotation speed $N_E'$, the engine start/stop control means 88 executes the engine torque generation control that supplies (injects) fuel with the fuel injection device 66 while the ignition device 68 ignites the fuel to generate the engine torque $T_E$, thereby starting engine 8 to make the switch from the motor running to the engine running. If the accelerator pedal is returned to reduce the request drive force $F_R$ and the vehicle state changes from the engine running range to the motor running range of the drive force source switching line diagram, the engine start/stop control means 88 causes the fuel injection device 66 to stop the fuel supply, i.e., stops the engine 8 by fuel cut to make the switch from the engine running to the motor running by the hybrid control means 86.

The hybrid control means 86 can cause the first electric motor M1 to freely rotate, i.e., idle in the no-load state to put the differential portion 11 into the state unable to transmit a torque, i.e., the state equivalent to the state with the power transmission path interrupted in the differential portion 11, in which the output from the differential portion 11 is not generated. Therefore, the hybrid control means 86 can put the first electric motor M1 into the no-load state to put the differential portion 11 into the neutral state (neutral state) that electrically interrupts the power transmission path.

The hybrid control means 86 provides the regenerative control that puts the engine 8 into the non-driving state to convert kinetic energy of the vehicle 6 transmitted from the drive wheels 34 into the electric energy with the differential portion 11 to improve the fuel consumption (reduce a fuel consumption rate) during the inertia running (during coasting) with the acceleration turned off or during the wheel brake being actuated by a brake pedal operation. Specifically, the hybrid control means 86 provides the regenerative control that rotationally drives and causes the second electric motor M2 to operate as an electric generator by a reverse drive force transmitted from the drive wheels 34 toward the engine 8 so as to charge the electric storage device 56 via the inverter 54 with the electric energy, i.e., a current generated by the second electric motor. In other words, the hybrid control means 86 functions as a regenerative control means that provides the regenerative control.

Figure 8:
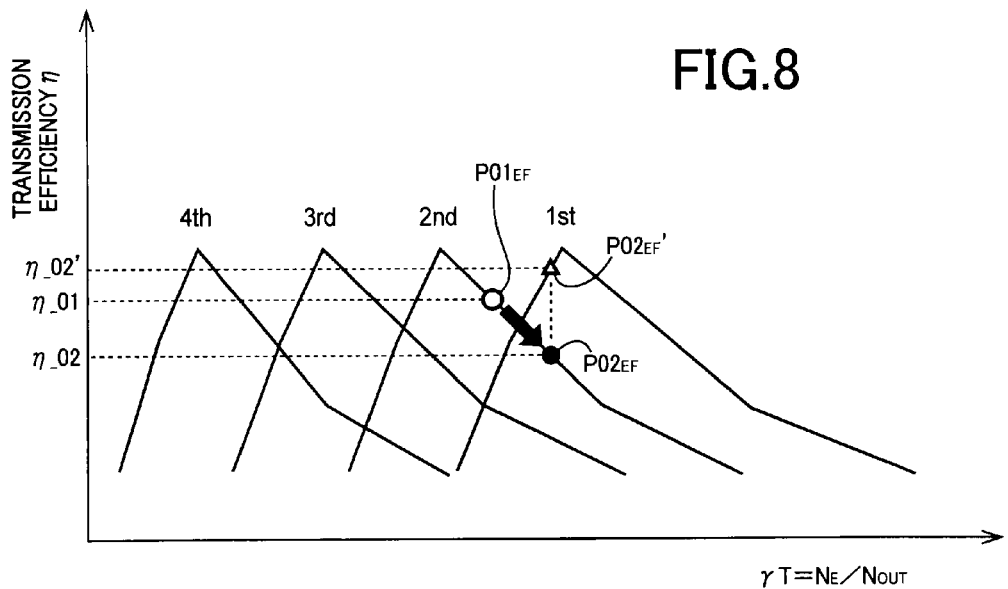
FIG. 8 is a diagram of a relationship between the general gear ratio of the vehicle power transmission device and transmission efficiency thereof in the gear stages (1st to 4th) of the automatic shifting portion included in the vehicle power transmission device of the FIG. 1.

FIG. 8 is a diagram of a relationship between the general gear ratio γT of the power transmission device 10 and transmission efficiency η of the power transmission device 10 in the gear stages (1st to 4th) of the automatic shifting portion 20. The transmission efficiency η of the power transmission device 10 is efficiency of transmission of power by the power transmission device 10 and is expressed by a rate of an output $P_{OUT}$ (e.g., in "kW") of the power transmission device 10 to the engine output $P_E$ that is the input power to the power transmission device 10 (=$P_{OUT}/P_E$), for example, if an electric power balance of the electric storage device 56 is zero.

As depicted in FIG. 8, the transmission efficiency η of the power transmission device 10 varies depending on a gear ratio γ0 of the differential portion 11 and a gear stage of the automatic shifting portion 20, i.e., the general gear ratio γT of the power transmission device 10. For example, focusing attention on one gear stage of the first to fourth gear stages of the automatic shifting portion 20, since it is assumed that the gear ratio $\gamma_{AT}$ of the automatic shifting portion 20 is not changed, the transmission efficiency η of the power transmission device 10 exhibits a transmission efficiency variation tendency in which the transmission efficiency η is maximized by a certain general gear ratio γT, i.e., a certain gear ratio γ0 of the differential portion 11 and is reduced as the gear ratio γ0 of the differential portion 11 is more deviated from the certain gear ratio γ0. In FIG. 8, the transmission efficiency variation tendency is moved substantially parallel in the direction of change of the general gear ratio γT due to a shift of the automatic shifting portion 20.

Figure 7:
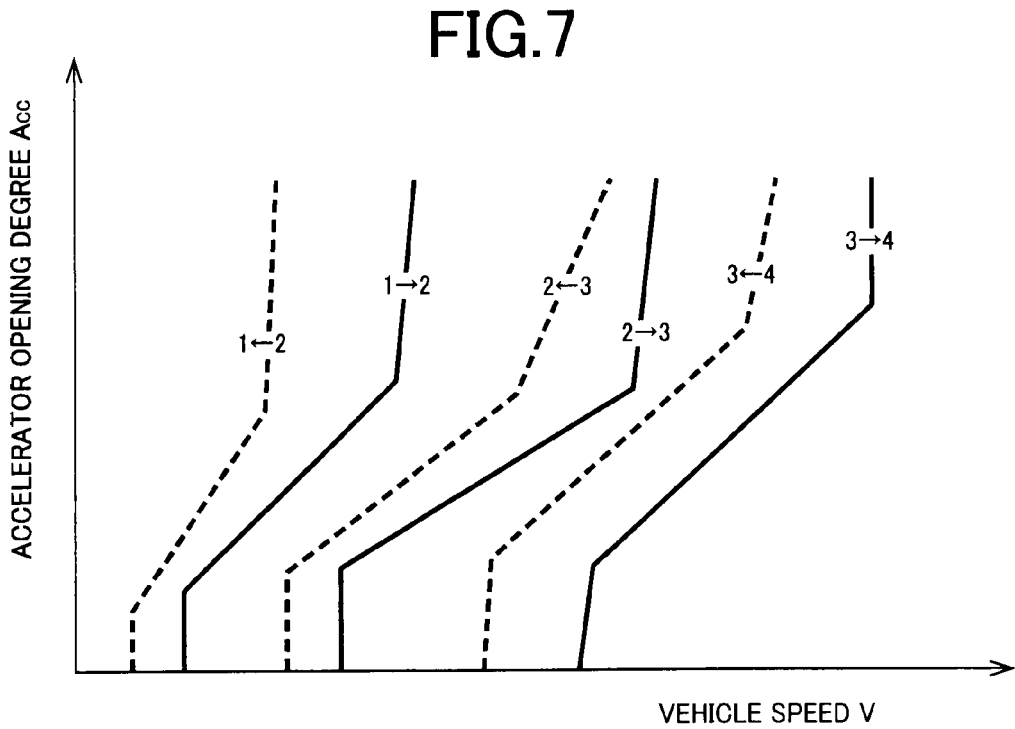
FIG. 7 is a shift line diagram that is another examples equivalent to FIG. 6, that is using the vehicle speed and the accelerator opening degree preliminarily stored as parameters, and which are the basis for the shift determination of the automatic shifting portion included in the vehicle power transmission device of the FIG. 1.
Figure 9:
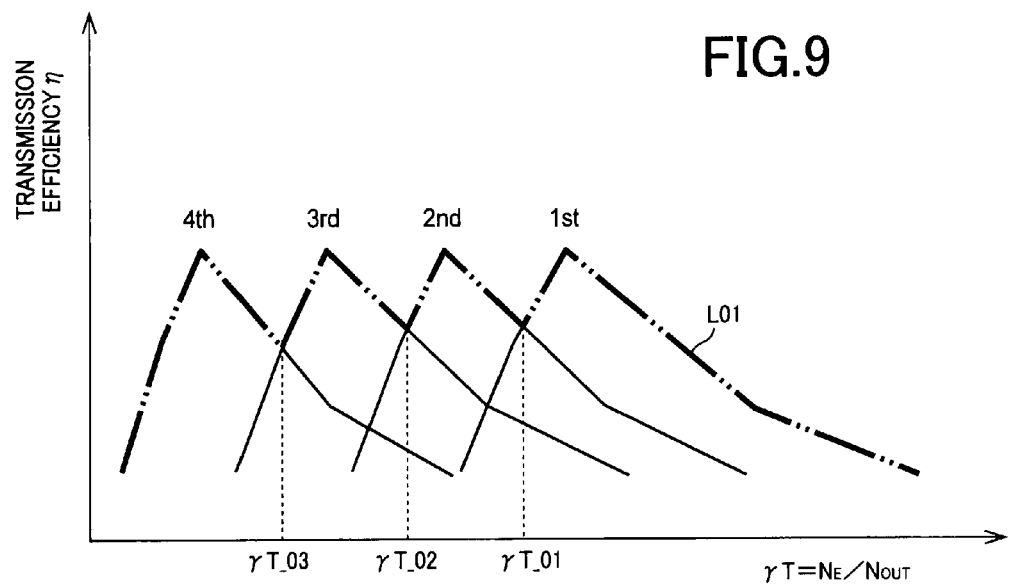
FIG. 9 is a diagram for explaining a relationship between the shift line diagrams of FIGS. 6, 7 and 11, and the transmission efficiency of the vehicle power transmission device as depicted in FIG. 8.

Since the maintenance of the higher transmission efficiency η of the power transmission device 10 leads to the improvement of fuel consumption, the upshift lines and the downshift lines in the shift line diagrams of FIGS. 6 and 7 described above are set such that the relationship between the general gear ratio γT and the transmission efficiency η is changed along a dashed-two dotted line L01 of FIG. 9, i.e., the transmission efficiency η is maintained higher in the entire variation range of the general gear ratio γT from the transmission efficiency variation tendency in the gear stages of the automatic shifting portion 20 depicted in FIG. 8. In this case, the upshift lines and the downshift lines are set on the premise of a predetermined state in which the load of accessories such as the air conditioner 42 is small and the charge remaining amount SOC of the electric storage device 56 is sufficient, for example. A curve representative of a relationship between the general gear ratio γT of the power transmission device 10 and the transmission efficiency η in the gear stages (1st to 4th) of FIG. 9 (transmission efficiency curve) is the same as that of FIG. 8.

Although the engine output $P_E$ is basically consumed for the running of a vehicle, the engine output $P_E$ may be increased due to a purpose other than the running of a vehicle, if the load of the accessories is larger or if the charge remaining amount SOC of the electric storage device 56 comes closer to the lower limit and charging is required, for example. One example will be described with reference to FIG. 10.

Figure 10:
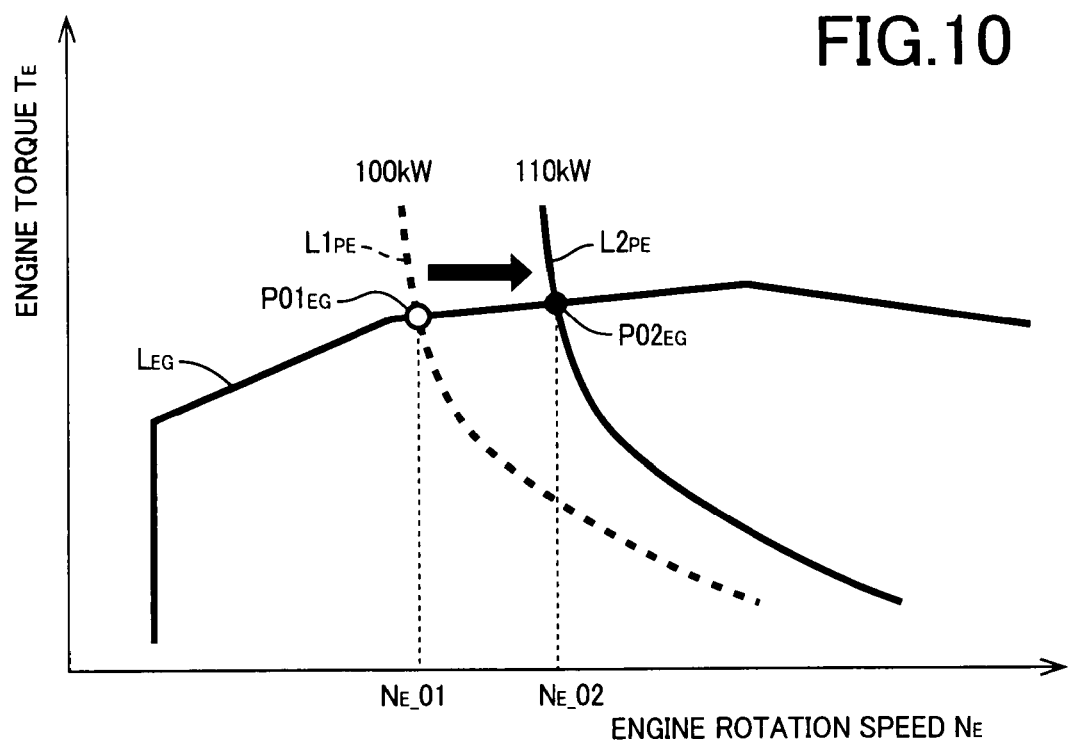
FIG. 10 is a diagram for explaining how the engine operation point is changed if the engine output connected to input shaft of the vehicle power transmission device of the FIG. 1 varies.

FIG. 10 is a diagram for explaining how the engine operation point is changed if the engine output $P_E$ varies. For example, it is assumed that the engine output $P_E$ is increased from 100 kW to 110 kW for charging the electric storage device 56 when the automatic shifting portion 20 is at the second speed gear stage (2nd). The 100 kW is the engine output $P_E$ for the purpose of the running of a vehicle. In this case, in FIG. 10, the hybrid control means 86 operates the engine 8 while moving the engine operation point along an operation curve (the optimal fuel consumption rate curve) $L_{EG}$ of the engine 8, and therefore changes the engine operation point from an intersecting point $P01_{EG}$ between an equal power curve $L1_{PE}$ of 100 kW and the operation curve $L_{EG}$ to an intersecting point $P02_{EG}$ between an equal power curve $L2_{PE}$ of 110 kW and the operation curve $L_{EG}$. As a result, the engine rotation speed $N_E$ increases from $N_E\_01$ indicated by the intersecting point $P01_{EG}$ to $N_E\_02$ indicated by the intersecting point $P02_{EG}$. Since the vehicle speed V is not changed in this case, the increase in the engine rotation speed $N_E$ is absorbed by the variation of the gear ratio γ0 of the differential portion 11, and since the driver request drive force FR (accelerator opening degree $A_{CC}$) is not changed, the automatic shifting portion 20 is not shifted from the second speed gear stage based on the shift line diagram of FIG. 6 or 7.

However, when such a change of the engine operation point is depicted in FIG. 8, the transmission efficiency η of the power transmission device 10 may be changed from a point $P01_{EF}$ to a point $P02_{EF}$ on the transmission efficiency curve of the second speed gear stage (2nd) and reduced from η_01 to η_02. On the other hand, if the automatic shifting portion 20 is shifted from the second speed gear stage to the first speed gear stage, the transmission efficiency η of the power transmission device 10 may be changed from the point $P01_{EF}$ to a point $P02_{EF}'$ and increased from η_01 to η_02'.

In terms of the change in the transmission efficiency η of the power transmission device 10 as described above, when it is determined whether a shift of the automatic shifting portion 20 should be executed based on the shift line diagram of FIG. 6 or 7 using the driver request drive force $F_R$ (accelerator opening degree $A_{CC}$) and the vehicle speed V as axial parameters, the transmission efficiency η of the power transmission device 10 may possibly be reduced, deteriorating the fuel consumption on the contrary.

Therefore, in this embodiment, to determined whether the a shift of the automatic shifting portion 20 should be executed while suppressing the deterioration of fuel consumption due to the reduction in the transmission efficiency the shift line diagram of FIG. 6 (FIG. 7) is switched to another shift line diagram under a certain condition. A main portion of a control function for this purpose will hereinafter be described.

As depicted in FIG. 5, the electronic control device 80 includes the stepped shift control means 82, the storage means 84, and the hybrid control means 86 and additionally includes a fuel consumption priority running state determining means 92 as a fuel consumption priority running state determining portion, a shift point setting means 94 as a shift point setting portion, and a shift point setting change prohibiting means 96 as a shift point setting change prohibiting portion.

Figure 11:
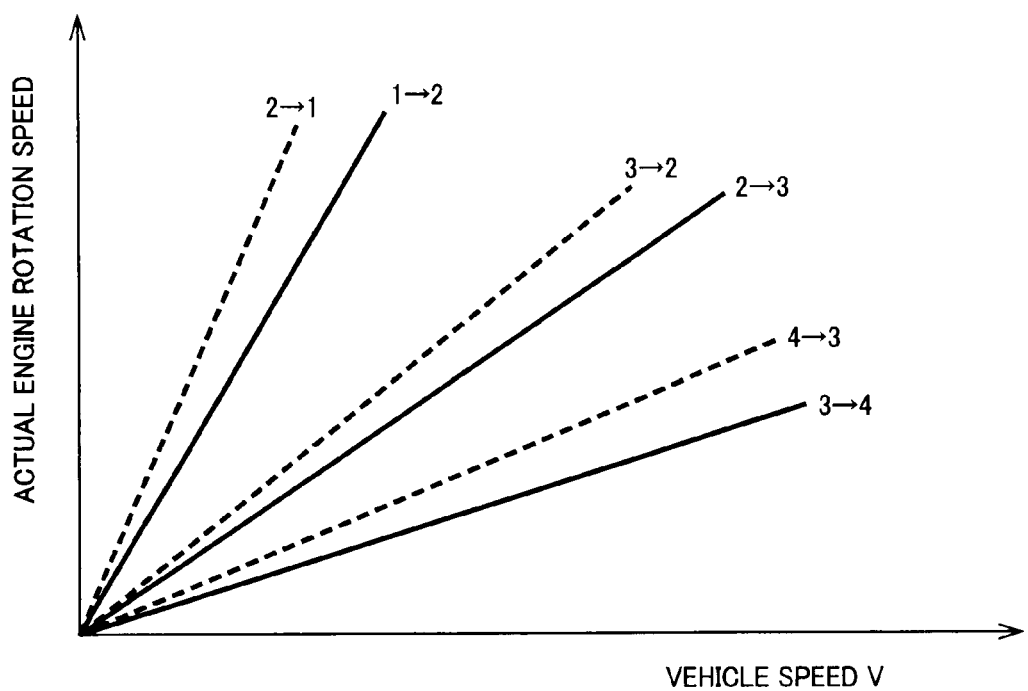
FIG. 11 is a shift line diagram that is using the vehicle speed and the actual engine rotation speed preliminarily stored as parameters, and which are the basis for the shift determination of the automatic shifting portion included in the vehicle power transmission device of the FIG. 1.

The storage means 84 preliminarily stores a shift line diagram having upshift lines (solid lines) and downshift lines (broken lines) using the vehicle speed V and the actual engine rotation speed $N_E$ (actual engine rotation speed) as variables (axial parameters) as depicted in FIG. 11, along with and as an alternative to the shift line diagram of FIG. 6 or 7 in addition to the function described above. In FIG. 11, all the shift lines (upshift lines, downshift lines) are straight lines from an original point (V=0, $N_E$=0) and the shift lines are set such that the relationship between the general gear ratio γT and the transmission efficiency η is changed along the dashed-two dotted line L01 of FIG. 9. For example, since the output shaft rotation speed $N_{OUT}$ corresponds one-on-one to the vehicle speed V and the general gear ratio γT defined as the horizontal axis of FIG. 9 is "$N_E/N_{OUT}$", the gradient (=$N_E/V$) of the upshift line from the first speed to the second speed of FIG. 11 is calculated and determined from a general gear ratio γT_01 (see FIG. 9) at which the high/low relationship between the transmission efficiency η on the first speed gear stage and the transmission efficiency η on the second speed gear stage is inverted. Similarly, the gradient of the upshift line from the second speed to the third speed and the gradient of the upshift line from the third speed to the fourth speed of FIG. 11 are respectively calculated and determined from general gear ratios γT_02 and γT_03 of FIG. 9. The gradients of the downshift lines are determined with hysteresis relative to the corresponding upshift lines.

The fuel consumption priority running state determining means 92 determines whether the vehicle 6 is in a predetermined fuel consumption priority running state. The fuel consumption priority running state is a vehicle state of prioritizing the improvement of fuel consumption over acceleration response and comfort and the like in the running of a vehicle. Various cases are specifically considered as the case of the fuel consumption priority running state of the vehicle 6. A first example of the case of the fuel consumption priority running state of the vehicle 6 is the case that the fuel consumption priority running mode is manually selected to improve the fuel consumption as compared to when the mode is not selected. In this example, the fuel consumption priority running state determining means 92 determines that the vehicle 6 is in the fuel consumption priority running state if the fuel consumption priority running mode is manually selected. The fuel consumption priority running mode is selected by operating and turning on the eco mode switch 44. The fuel consumption performance is prioritized over the running performance of the vehicle 6 in the fuel consumption priority running mode and, for example, an air-fuel ratio of the engine 8 is changed to improve the fuel consumption as compared to when the mode is not selected, for example.

A second example of the case of the fuel consumption priority running state of the vehicle 6 is the case that an output request amount $P_{EEX}$ (e.g., in "kW") requested to the engine 8 for charging the electric storage device 56 is equal to or greater than a predetermined output request amount determination value $P1_{EEX}$. In this example, the fuel consumption priority running state determining means 92 determines that the vehicle 6 is in the fuel consumption priority running state if the output request amount $P_{EEX}$ is equal to or greater than the output request amount determination value $P1_{EEX}$. The output request amount $P_{EEX}$ is calculated by the hybrid control means 86 based on, for example, the charge remaining amount SOC of the electric storage device 56 and the current running state, and the hybrid control means 86 changes the engine operation point as described above with reference to FIG. 10 so as to cause the engine 8 to achieve the engine output $P_E$ acquired by adding the output request amount $P_{EEX}$ to the output (power) necessary for the running of a vehicle. Describing with reference to FIG. 10, for example, if the engine operation point is changed from the point $P01_{EG}$ to the point $P02_{EG}$ by the hybrid control means 86 for charging the electric storage device 56, it can be said that the output request amount $P_{EEX}$ in this case is 10 kW (=110 kW−100 kW). Therefore, the output request amount $P_{EEX}$ may be rephrased as the engine output $P_E$ achieved for charging the electric storage device 56. The output request amount determination value $P1_{EEX}$ is a determination value empirically set on the assumption that if the output request amount $P_{EEX}$ becomes equal to or greater than the determination value, the reduction of the transmission efficiency η leading to deterioration of fuel consumption may occur due to the displacement of the engine operation point for charging the electric storage device 56, provided that the automatic shifting portion 20 is not shifted.

A third example of the case of the fuel consumption priority running state of the vehicle 6 is the case that the charge remaining amount SOC of the electric storage device 56 is less than a predetermined remaining amount determination value $X1_{SOC}$ while the output request amount $P_{EEX}$ requested to the engine 8 for charging the electric storage device 56 is equal to or greater than the output request amount determination value $P1_{EEX}$. In this example, the fuel consumption priority running state determining means 92 determines that the vehicle 6 is in the fuel consumption priority running state if the charge remaining amount SOC of the electric storage device 56 is less than the remaining amount determination value $X1_{SOC}$ and the output request amount $P_{EEX}$ is equal to or greater than the output request amount determination value $P1_{EEX}$. The remaining amount determination value $X1_{SOC}$ is a determination value empirically set on the assumption that if the charge remaining amount SOC of the electric storage device 56 becomes less than the determination value, the electricity consumption from the electric storage device 56 must be suppressed as far as possible, and is set to a value greater than and close to the lower allowable value of the charge remaining amount SOC, for example.

A fourth example of the case of the fuel consumption priority running state of the vehicle 6 is the case that an air-conditioner request power $P_{RAC}$ (e.g., in "kW") necessary for driving the air conditioner 42 is equal to or greater than a predetermined air-conditioner request power determination value $P1_{RAC}$ while the output request amount $P_{EEX}$ requested to the engine 8 for charging the electric storage device 56 is equal to or greater than the output request amount determination value $P1_{EEX}$. In this example, the fuel consumption priority running state determining means 92 determines that the vehicle 6 is in the fuel consumption priority running state if the air-conditioner request power $P_{RAC}$ is equal to or greater than the air-conditioner request power determination value $P1_{RAC}$ and the output request amount $P_{EEX}$ is equal to or greater than the output request amount determination value $P1_{EEX}$. Since the air conditioner 42 considerably consumes the engine output $P_E$ among other accessories included in the vehicle 6, the determination is made on the air-conditioner request power $P_{RAC}$. For example, the air-conditioner request power $P_{RAC}$ is calculated based on details of air-conditioner operations of a driver and a temperature inside a vehicle and, as is the case with the change in the engine operation point described with reference to FIG. 10, the hybrid control means 86 causes the engine 8 to achieve the engine output $P_E$ acquired by adding the air-conditioner request power $P_{RAC}$ to the output (power) necessary for the running of a vehicle. Therefore, the air-conditioner request power $P_{RAC}$ may be rephrased as the engine output $P_E$ achieved for driving the air conditioner 42. The air-conditioner request power determination value $P1_{RAC}$ is a determination value empirically set on the assumption that if the air-conditioner request power $P_{RAC}$ becomes equal to or greater than the determination value, the reduction of the transmission efficiency η leading to deterioration of fuel consumption may occur due to the displacement of the engine operation point for driving the air conditioner 42 when the output request amount $P_{EEX}$ is equal to or greater than the output request amount determination value $P1_{EEX}$, provided that the automatic shifting portion 20 is not shifted.

A fifth example of the case of the fuel consumption priority running state of the vehicle 6 is the case that a remaining amount $ST_{FL}$ of fuel to be supplied to the engine 8 is less than a predetermined fuel remaining amount determination value $ST1_{FL}$. In this example, the fuel consumption priority running state determining means 92 determines that the vehicle 6 is in the fuel consumption priority running state if the fuel remaining amount $ST_{FL}$ is less than the fuel remaining amount determination value $ST1_{FL}$. Since it is thought that the necessity for achieving the improvement of fuel consumption is increased when the fuel remaining amount $ST_{FL}$ is reduced, the determination is made on the fuel remaining amount $ST_{FL}$. The fuel remaining amount $ST_{FL}$ is detected by a fuel remaining amount sensor disposed in a fuel tank of the vehicle 6, for example. The fuel remaining amount determination value $ST1_{FL}$ is a determination value empirically set on the assumption that if the fuel remaining amount $ST_{FL}$ becomes less than the determination value, the improvement of fuel consumption must be achieved as far as possible.

The shift point setting means 94 sets shift points (shift lines) of the automatic shifting portion 20 such that the transmission efficiency η of the power transmission device 10 is maintained higher in the entire variation range of the general gear ratio γT, specifically, such that the relationship between the general gear ratio γT and the transmission efficiency η is changed along the dashed-two dotted line L01 of FIG. 9. In this case, the shift points (shift lines) of the automatic shifting portion 20 are basically set by using the driver request drive force $F_R$ and the vehicle speed V as variables as depicted in FIG. 6 and, in other words, the shift points (shift lines) of the automatic shifting portion 20 are set in accordance with the driver request drive force $F_R$ and the vehicle speed V. Specifically, in this embodiment, since the storage means 84 preliminarily stores the shift line diagram of FIG. 6 having the shift points (shift lines) of the automatic shifting portion 20 set in accordance with the driver request drive force $F_R$ and the vehicle speed V, the shift point setting means 94 commands the stepped shift control means 82 to execute a shift of the automatic shifting portion 20 based on the shift line diagram of FIG. 6. In other words, this command is considered to set the shift points (shift lines) of the automatic shifting portion 20 in accordance with the driver request drive force $F_R$ and the vehicle speed V. In response to this command, the stepped shift control means 82 determines whether a shift of the automatic shifting portion 20 should be executed, i.e., determines a shift stage to be achieved by the shift of the automatic shifting portion 20 based on the vehicle state indicated by the actual vehicle speed V and the driver request drive force $F_R$ from the shift line diagram of FIG. 6 as described above, and provides the automatic transmission control of the automatic shifting portion 20 so as to acquire the determined shift stage.

If the fuel consumption priority running state determining means 92 determines that the vehicle 6 is in the fuel consumption priority running state, the shift point setting means 94 sets the shift points (shift lines) of the automatic shifting portion 20 in accordance with the engine rotation speed $N_E$ and the vehicle speed V instead of the driver request drive force $F_R$ and, in other words, sets the shift points (shift lines) of the automatic shifting portion 20 by using the engine rotation speed $N_E$ and the vehicle speed V as variables, as depicted in FIG. 11. In this case, the shift point setting means 94 sets the shift points (shift lines) of the automatic shifting portion 20 such that the transmission efficiency η of the power transmission device 10 is maintained higher in the entire variation range of the general gear ratio γT in the same way. Specifically, in this embodiment, since the storage means 84 preliminarily stores the shift line diagram of FIG. 11 having the shift points (shift lines) of the automatic shifting portion 20 set in accordance with the engine rotation speed $N_E$ and the vehicle speed V, if the fuel consumption priority running state determining means 92 determines that the vehicle 6 is in the fuel consumption priority running state, the shift point setting means 94 commands the stepped shift control means 82 to execute a shift of the automatic shifting portion 20 based on the shift line diagram of FIG. 11. In other words, this command is considered to set the shift points (shift lines) of the automatic shifting portion 20 in accordance with the engine rotation speed $N_E$ and the vehicle speed V. In response to the command, the stepped shift control means 82 determines whether a shift of the automatic shifting portion 20 should be executed, i.e., determines a shift stage to be achieved by the shift of the automatic shifting portion 20 based on the vehicle state indicated by the actual vehicle speed V and the engine rotation speed $N_E$ from the shift line diagram of FIG. 11 as is the case with the shift line diagram of FIG. 6, and provides the automatic transmission control of the automatic shifting portion 20 so as to acquire the determined shift stage.

Although the shift point setting means 94 sets the shift points of the automatic shifting portion 20 in accordance with the engine rotation speed $N_E$ and the vehicle speed V instead of the driver request drive force $F_R$ if the fuel consumption priority running state determining means 92 determines that the vehicle 6 is in the fuel consumption priority running state as described above, the shift point setting change prohibiting means 96 may prohibit the setting of the shifting points of the automatic shifting portion 20 in accordance with the engine rotation speed $N_E$ and the vehicle speed V. This prohibited case will hereinafter be described.

The shift point setting change prohibiting means 96 determines whether a variation $VF_R$ of the driver request drive force $F_R$ (hereinafter, a "request drive force variation $VF_R$") within a predetermined period TIME1 is equal to or greater than a predetermined request drive force variation determination value $VF1_R$ and, if the request drive force variation $VF_R$ within the predetermined period TIME1 is equal to or greater than the request drive force variation determination value $VF1_R$, the shift point setting change prohibiting means 96 prohibits the shift point setting means 94 from setting the shift points of the automatic shifting portion 20 in accordance with the engine rotation speed $N_E$ and the vehicle speed V. The determination is made on the request drive force variation $VF_R$ for the purpose of executing a shift of the automatic shifting portion 20 in a manner responsive to a change in the request drive force $F_R$ by using the shift line diagram of FIG. 6 employing the request drive force $F_R$ as one of variables if a transient variation width of the request drive force $F_R$ (accelerator opening degree $A_{CC}$) is large. The predetermined period TIME1 is, for example, a few seconds or a few minutes immediately before the shift point setting change prohibiting means 96 makes the determination and is a period empirically set for determining whether a shift of the automatic shifting portion 20 must be executed in a manner responsive to a change in the request drive force $F_R$ so as not to give a sense of discomfort to a driver. The request drive force variation $VF_R$ is, for example, a difference (absolute value) between the maximum value and the minimum value of the request drive force $F_R$ in the predetermined period TIME1. The request drive force variation determination value $VF1_R$ is a determination value empirically set on the assumption that if the request drive force variation $VF_R$ within the predetermined period TIME1 is equal to or greater than the determination value, a shift of the automatic shifting portion 20 must be executed in a manner responsive to a change in the request drive force $F_R$ so as not to give a sense of discomfort to a driver. Since the driver request drive force $F_R$ corresponds to the accelerator opening degree $A_{CC}$, the shift point setting change prohibiting means 96 may determine whether a variation of the accelerator opening degree $A_{CC}$ within the predetermined period TIME1 is equal to or greater than a predetermined accelerator opening degree determination value corresponding to the request drive force variation determination value $VF1_R$ and, if the variation of the accelerator opening degree $A_{CC}$ within the predetermined period TIME1 is equal to or greater than the accelerator opening degree determination value, the shift point setting change prohibiting means 96 may prohibit the shift point setting means 94 from setting the shift points of the automatic shifting portion 20 in accordance with the engine rotation speed $N_E$ and the vehicle speed V.

The shift point setting change prohibiting means 96 also determines whether the power running mode is manually selected to improve the acceleration response during running of a vehicle as compared to when the mode is not selected and, if the power running mode is manually selected, the shift point setting change prohibiting means 96 prohibits the shift point setting means 94 from setting the shift points of the automatic shifting portion 20 in accordance with the engine rotation speed $N_E$ and the vehicle speed V. The determination is made on whether the power running mode is selected, for the purpose of executing a shift of the automatic shifting portion 20 in a manner responsive to a change in the request drive force $F_R$ because a driver intends to achieve the running responsive to the request drive force $F_R$ (accelerator opening degree $A_{CC}$) when the power running mode is selected. The power running mode is selected by operating and turning on the power mode switch 46. In the power running mode, for example, an air-fuel ratio of the engine 8 is changed to improve the acceleration response during running of a vehicle as compared to when the mode is not selected.

If the shift point setting change prohibiting means 96 prohibits the setting of the shifting points of the automatic shifting portion 20 in accordance with the engine rotation speed $N_E$ and the vehicle speed V, the shift point setting means 94 sets the shift points (shift lines) of the automatic shifting portion 20 by using the driver request drive force $F_R$ and the vehicle speed V as variables, as depicted in the shift line diagram of FIG. 6 instead of FIG. 11 and, in other words, sets the shift points (shift lines) of the automatic shifting portion 20 in accordance with the driver request drive force $F_R$ and the vehicle speed V. In this case, the shift line diagram of FIG. 7 may be used for determining a shift of the automatic shifting portion 20 instead of FIG. 6 as described above. For example, assuming that the shift line diagram of FIG. 7 is used instead of FIG. 6, if the shift point setting change prohibiting means 96 prohibits the setting of the shifting points of the automatic shifting portion 20 in accordance with the engine rotation speed $N_E$ and the vehicle speed V, the shift point setting means 94 sets the shift points (shift lines) of the automatic shifting portion 20 in accordance with the accelerator opening degree $A_{CC}$ and the vehicle speed V as depicted in the shift line diagram of FIG. 7 instead of FIG. 11.

Figure 12:
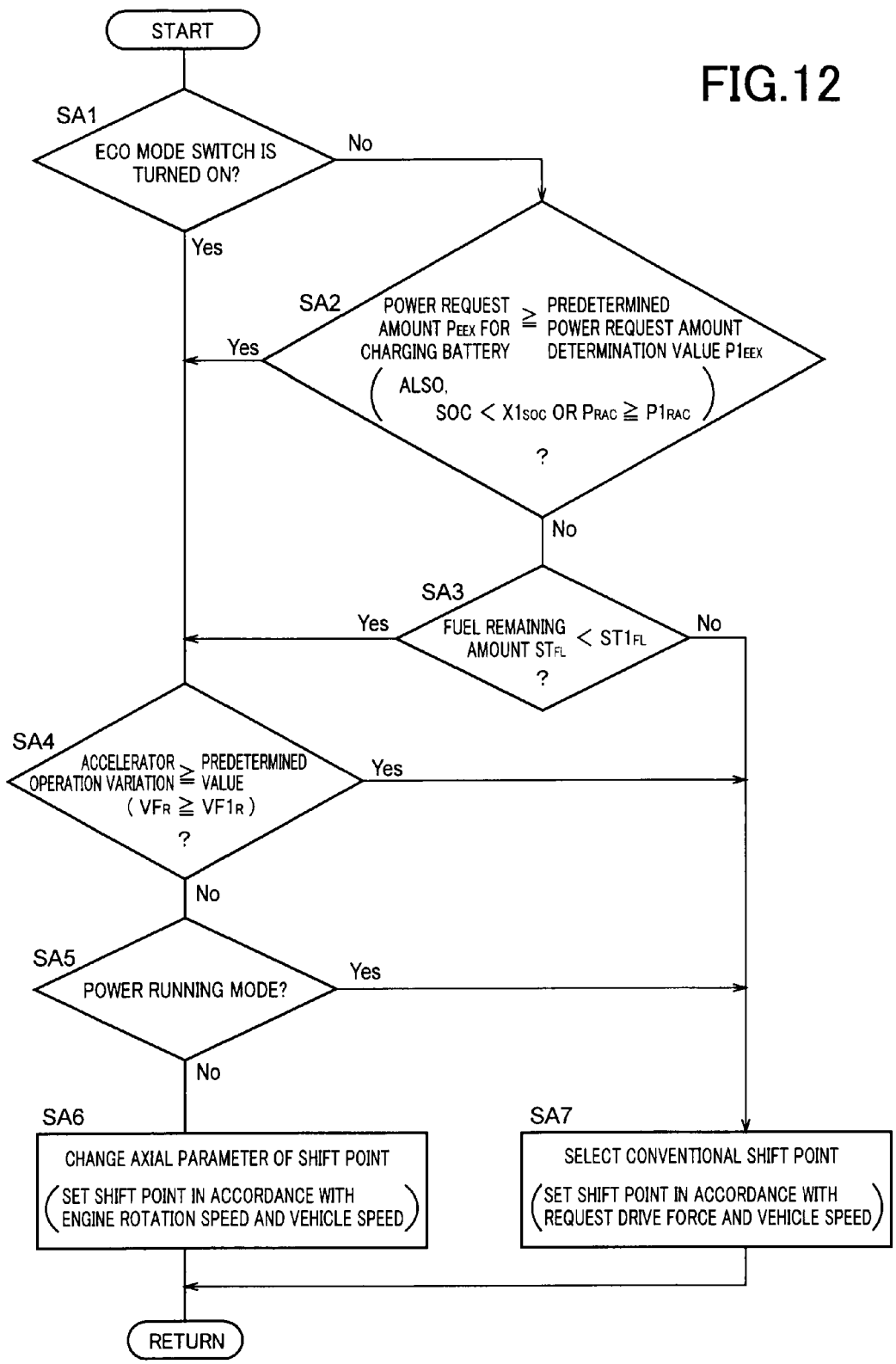
FIG. 12 is a flowchart for explaining a main portion of the control operation of the electronic control device of FIG. 4, i.e., the control operation of switching a variable for setting the shift points of the automatic shifting portion.

FIG. 12 is a flowchart for explaining a main portion of the control operation of the electronic control device 80, i.e., the control operation of switching a variable for setting the shift points of the automatic shifting portion 20, which is repeatedly executed with an extremely short cycle time, for example, on the order of few msec to a few tens of msec.

First, at step (hereinafter, "step" will be omitted) SA1, it is determined whether the fuel consumption priority running mode is manually selected. The fuel consumption priority running mode is selected by operating and turning on the eco mode switch 44. If the determination at SA1 is affirmative, i.e., if the fuel consumption priority running mode is manually selected, the operation goes to SA4. In contrast, if the determination at SA1 is negative, the operation goes to SA2.

At SA2, it is determined whether a request amount of the engine output $P_E$ requested to the engine 8 other than the request from a driver is equal to or greater than a predetermined value empirically set for determining that a change in the engine operation point leads to deterioration of fuel consumption if the request amount does not exists. Specifically, it is determined whether the output request amount $P_{EEX}$ requested to the engine 8 for charging the electric storage device 56 is equal to or greater than the output request amount determination value $P1_{EEX}$. If the determination at SA2 is affirmative, i.e., if the output request amount $P_{EEX}$ is equal to or greater than the output request amount determination value $P1_{EEX}$, the operation goes to SA4. In contrast, if the determination at SA2 is negative, the operation goes to SA3.

At SA2, the determination result at SA2 may be affirmed or denied as a result of making a determination on the charge remaining amount SOC of the electric storage device 56 or the air-conditioner request power $P_{RAC}$ in addition to the output request amount $P_{EEX}$.

For example, if a determination is also made on the charge remaining amount SOC of the electric storage device 56 in addition to the output request amount $P_{EEX}$, it is determined whether the charge remaining amount SOC of the electric storage device 56 is less than the remaining amount determination value $X1_{SOC}$ and whether the output request amount $P_{EEX}$ is equal to or greater than the output request amount determination value $P1_{EEX}$. The determination at SA2 is affirmative if the charge remaining amount SOC is less than the remaining amount determination value $X1_{SOC}$ and the output request amount $P_{EEX}$ is equal to or greater than the output request amount determination value $P1_{EEX}$; otherwise, the determination at SA2 is negative.

If a determination is also made on the air-conditioner request power $P_{RAC}$ in addition to the output request amount $P_{EEX}$, it is determined whether the air-conditioner request power $P_{RAC}$ is equal to or greater than the air-conditioner request power determination value $P1_{RAC}$ and whether the output request amount $P_{EEX}$ is equal to or greater than the output request amount determination value $P1_{EEX}$. The determination at SA2 is affirmative if the air-conditioner request power $P_{RAC}$ is equal to or greater than the air-conditioner request power determination value $P1_{RAC}$ and the output request amount $P_{EEX}$ is equal to or greater than the output request amount determination value $P1_{EEX}$; otherwise, the determination at SA2 is negative.

At SA3, it is determined whether the fuel remaining amount $ST_{FL}$ is less than the fuel remaining amount determination value $ST1_{FL}$. If the determination at SA3 is affirmative, i.e., if the fuel remaining amount $ST_{FL}$ is less than the fuel remaining amount determination value $ST1_{FL}$, the operation goes to SA4. In contrast, if the determination at SA2 is negative, the operation goes to SA7. SA1, SA2, and SA3 correspond to the fuel consumption priority running state determining means 92.

At SA4, it is determined whether the request drive force variation $VF_R$ within the predetermined period TIME1 is equal to or greater than the request drive force variation determination value $VF1_R$. Since the driver request drive force $F_R$ corresponds to the accelerator opening degree $A_{CC}$, it may be determined at SA4 whether a variation of the accelerator opening degree $A_{CC}$ within the predetermined period TIME1 is equal to or greater than the accelerator opening degree determination value corresponding to the request drive force variation determination value $VF1_R$. If the determination at SA4 is affirmative, i.e., if the request drive force variation $VF_R$ within the predetermined period TIME1 is equal to or greater than the request drive force variation determination value $VF1_R$, the setting of the shift points of the automatic shifting portion 20 in accordance with the engine rotation speed $N_E$ and the vehicle speed V is prohibited and, therefore, the operation goes to SA7. In contrast, if the determination at SA4 is negative, the operation goes to SA5.

At SA5, it is determined whether the power running mode is manually selected. The power running mode is selected by operating and turning on the power mode switch 46. If the determination at SA5 is affirmative, i.e., if the power running mode is manually selected, the setting of the shift points of the automatic shifting portion 20 in accordance with the engine rotation speed $N_E$ and the vehicle speed V is prohibited and, therefore, the operation goes back to SA7. In contrast, if the determination at SA5 is negative, the operation goes to SA6. SA4 and SA5 correspond to the shift point setting change prohibiting means 96.

At SA6, the driver request drive force $F_R$, i.e., the axial parameter in the shift line diagram of FIG. 6 is changed to the engine rotation speed $N_E$ as depicted in the shift line diagram of FIG. 11. As a result, as depicted in the shift line diagram of FIG. 11, the shift points (shift lines) of the automatic shifting portion 20 are set in accordance with the engine rotation speed $N_E$ and the vehicle speed V. Therefore, a shift of the automatic shifting portion 20 is executed based of the shift line diagram of FIG. 11.

At SA7, the axial parameter in the shift line diagram of FIG. 6 is not changed and the shift points (shift lines) of the automatic shifting portion 20 are set in accordance with the driver request drive force $F_R$ and the vehicle speed V. Therefore, a shift of the automatic shifting portion 20 is executed based of the shift line diagram of FIG. 6. SA6 and SA7 correspond to the shift point setting means 94.

This embodiment has the following effects (A1) to (A9). (A1) According to this embodiment, although the shift point setting means 94 basically sets the shift points (shift lines) of the automatic shifting portion 20 in accordance with the driver request drive force $F_R$ and the vehicle speed V as depicted in the shift line diagram of FIG. 6, if the fuel consumption priority running state determining means 92 determines that the vehicle 6 is in the fuel consumption priority running state, the shift point setting means 94 sets the shift points (shift lines) of the automatic shifting portion 20 in accordance with the engine rotation speed $N_E$ and the vehicle speed V instead of the driver request drive force $F_R$ and, in other words, sets the shift points (shift lines) of the automatic shifting portion 20 by using the engine rotation speed $N_E$ and the vehicle speed V as variables, as depicted in the shift line diagram of FIG. 11. Therefore, whether the shift should be executed can immediately be determined when the engine operation point is changed even if the driver request drive force $F_R$ is not changed, and the shift can be executed to establish a gear stage of the automatic shifting portion 20 having a higher transmission efficiency η of the power transmission device 10 as compared to the case that the shift points are always set in accordance with the driver request drive force $F_R$ and the vehicle speed V. As a result, the improvement of fuel consumption can be achieved by improving the transmission efficiency η in the case of the fuel consumption priority running state in which the improvement of fuel consumption should be prioritized. Since the shift points of the automatic shifting portion 20 are set in accordance with the driver request drive force $F_R$ and the vehicle speed V if not in the fuel consumption priority running state, a responsive shift of the automatic shifting portion 20 can be ensured that is capable of immediately responding to a transitional change in the request drive force $F_R$ (the accelerator opening degree $A_{CC}$).

(A2) According to this embodiment, since the case of the fuel consumption priority running state of the vehicle 6 is the case that the fuel consumption priority running mode is manually selected to improve the fuel consumption as compared to when the mode is not selected, an appropriate shift of the automatic shifting portion 20 is executed so as to improve fuel consumption in the running mode in which the improvement of fuel consumption of the vehicle 6 should be prioritized.

(A3) According to this embodiment, since the case of the fuel consumption priority running state of the vehicle 6 is the case that the output request amount $P_{EEX}$ (e.g., in "kW") requested to the engine 8 for charging the electric storage device 56 is equal to or greater than the predetermined output request amount determination value $P1_{EEX}$, if the transmission efficiency η of the power transmission device 10 can be improved by a shift of the automatic shifting portion 20, an appropriate shift of the automatic shifting portion 20 can be executed so as to improve fuel consumption through the improvement of the transmission efficiency η.

(A4) According to this embodiment, since the case of the fuel consumption priority running state of the vehicle 6 is the case that the remaining amount $ST_{FL}$ of fuel to be supplied to the engine 8 is less than the predetermined fuel remaining amount determination value $ST1_{FL}$, if it is necessary to prioritize the improvement of fuel consumption over the acceleration response etc., of the vehicle 6, an appropriate shift of the automatic shifting portion 20 is executed so as to improve fuel consumption.

(A5) According to this embodiment, since the case of the fuel consumption priority running state of the vehicle 6 is the case that the charge remaining amount SOC of the electric storage device 56 is less than the predetermined remaining amount determination value $X1_{SOC}$ while the output request amount $P_{EEX}$ requested to the engine 8 for charging the electric storage device 56 is equal to or greater than the output request amount determination value $P1_{EEX}$, if it is necessary to prioritize the improvement of fuel consumption over the acceleration response etc., of the vehicle 6 and the transmission efficiency η of the power transmission device 10 can be improved by a shift of the automatic shifting portion 20, an appropriate shift of the automatic shifting portion 20 can be executed so as to improve fuel consumption through the improvement of the transmission efficiency η.

(A6) According to this embodiment, since the case of the fuel consumption priority running state of the vehicle 6 is the case that the air-conditioner request power $P_{RAC}$ necessary for driving the air conditioner 42 is equal to or greater than the predetermined air-conditioner request power determination value $P1_{RAC}$ while the output request amount $P_{EEX}$ requested to the engine 8 for charging the electric storage device 56 is equal to or greater than the output request amount determination value $P1_{EEX}$, if the transmission efficiency η of the power transmission device 10 can be improved by a shift of the automatic shifting portion 20, an appropriate shift of the automatic shifting portion 20 can be executed so as to improve fuel consumption through the improvement of the transmission efficiency η.

(A7) According to this embodiment, if the request drive force variation $VF_R$ within the predetermined period TIME1 is equal to or greater than the request drive force variation determination value $VF1_R$, the shift point setting change prohibiting means 96 prohibits the shift point setting means 94 from setting the shift points of the automatic shifting portion 20 in accordance with the engine rotation speed $N_E$ and the vehicle speed V. As a result, the shift point setting means 94 sets the shift points (shift lines) of the automatic shifting portion 20 in accordance with the driver request drive force $F_R$ and the vehicle speed V. If the request drive force variation $VF_R$ is large, it is thought that the acceleration-responsive running of the vehicle 6 is necessary to be realized as compared to the case that the driver request drive force $F_R$ is hardly changed. The engine rotation speed $N_E$ is a variable of the vertical axis in the shift line diagram of FIG. 11 and is changed with a certain delay relative to a change in the accelerator opening degree $A_{CC}$ (driver request drive force $F_R$). Therefore, if the acceleration-responsive running of the vehicle 6 is emphasized, a responsive shift of the automatic shifting portion 20 can be ensured that is capable of immediately responding to a transitional change in the request drive force $F_R$ based on the shift line diagram of FIG. 6. Therefore, the drivability may be improved.

(A8) According to this embodiment, if the power running mode is manually selected to improve the acceleration response during running of a vehicle as compared to when the mode is not selected, the shift point setting change prohibiting means 96 prohibits the shift point setting means 94 from setting the shift points of the automatic shifting portion 20 in accordance with the engine rotation speed $N_E$ and the vehicle speed V. As a result, the shift point setting means 94 sets the shift points (shift lines) of the automatic shifting portion 20 in accordance with the driver request drive force $F_R$ and the vehicle speed V. Therefore, if the acceleration-responsive running of the vehicle 6 is emphasized, a responsive shift of the automatic shifting portion 20 can be ensured that is capable of immediately responding to a transitional change in the request drive force $F_R$ based on the shift line diagram of FIG. 6. Therefore, the drivability may be improved.

(A9) Since this embodiment is disposed with the differential portion 11 including the power distribution mechanism 16 coupled between the engine 8 and the automatic shifting portion 20, the first electric motor M1 coupled to the power distribution mechanism 16 in a power transmittable manner, and the second electric motor M2 coupled to the drive wheels 34 in a power transmittable manner with the differential state of the power distribution mechanism 16 controlled by controlling the operating state of the first electric motor M1, the automatic shifting portion 20 is a stepped transmission varying the gear ratio $γ_{AT}$ step-by-step and can also be caused to function as a stepless transmission capable of continuously varying the general gear ratio γT for the power transmission device 10 as a whole by controlling the differential state of the power distribution mechanism 16.

Although the embodiment of the present invention has been described in detail with reference to the drawings, this is merely one embodiment and the present invention can be implemented in variously modified or altered forms based on the knowledge of those skilled in the art.

For example, although the vertical axis of FIG. 6 is the driver request drive force $F_R$ in this embodiment, the drive force of the vehicle 6 corresponds one-on-one to the output torque $T_{OUT}$ of the power transmission device 10 (automatic shifting portion 20) and, therefore, the request drive force $F_R$ of the vertical axis of FIG. 6 may be replaced with a request output torque of the power transmission device 10 (automatic shifting portion 20) requested by a driver.

Although the shift point setting means 94 sets the shift points of the automatic shifting portion 20 in accordance with the engine rotation speed $N_E$ and the vehicle speed V instead of the driver request drive force $F_R$ as depicted in FIG. 11 if the fuel consumption priority running state determining means 92 determines that the vehicle 6 is in the fuel consumption priority running state in this embodiment, the shifting points are desirably set during the engine running.

Although the eco mode switch 44 and the power mode switch 46 are disposed on the vehicle 6 in this embodiment, the switches 44 and 46 may be configured not to be both turned on at the same time and alternatively be turned on, or to be both turned off at the same time.

In FIG. 12 of this embodiment, the flowchart may include only one step of SA1, SA2, and SA3 without other two steps. For example, in the case of the flowchart including only SA2 without SA1 and SA3, the operation first goes to SA2 and then goes to SA4 if the determination at SA2 is affirmative and goes to SA7 if the determination at SA2 is negative.

In FIG. 12 of this embodiment, the flowchart may not include one or both of SA4 and SA5. For example, in the case of the flowchart without both SA4 and SA5, if the determination is affirmative at any one of SA1, SA2, and SA3, the operation goes to SA6. In the case of the flowchart including SA4 without SA5, if the determination at SA4 is negative, the operation goes to SA6. In the case of the flowchart including SA5 without SA4, if the determination is affirmative at any one of SA1, SA2, and SA3, the operation goes to SA5.

Although the request drive force variation $VF_R$ is a difference (absolute value) between the maximum value and the minimum value of the request drive force $F_R$ within the predetermined period TIME1 in the description of this embodiment, this is not a limitation and the request drive force variation $VF_R$ may be any index representative of a magnitude of a change in the request drive force $F_R$ (accelerator opening degree $A_{CC}$).

Although the vehicle 6 includes the power distribution mechanism 16 as a differential mechanism and the first electric motor M1 in this embodiment, the vehicle 6 may be a so-called parallel hybrid vehicle that has the engine 8, a clutch, the second electric motor M2, the automatic shifting portion 20, and the drive wheels 34 coupled in series without including the first electric motor M1 and the power distribution mechanism 16, for example. Since the clutch is disposed as needed between the engine 8 and the second electric motor M2, the parallel hybrid vehicle may be configured without the clutch.

Although the vehicle 6 of this embodiment is a hybrid vehicle, the vehicle 6 may be a normal engine vehicle without the power distribution mechanism 16 and the electric motors M1, M2.

Although the second electric motor M2 is directly coupled to the transmitting member 18 in the above-described embodiment, the coupling position of the second electric motor M2 is not limited thereto and the second electric motor M2 may be coupled directly or indirectly via a transmission, a planetary gear device, an engagement device, etc., to the power transmission path from the engine 8 or the transmitting member 18 to the drive wheels 34.

Although the differential portion 11 functions as an electric stepless transmission with a gear ratio γ0 continuously varied from a minimum value γ0min to a maximum value γ0max by controlling the operating state of the first electric motor M1 in the embodiment, the differential portion 11 may have the gear ratio γ0 varied, not continuously, in a stepped manner on purpose by utilizing the differential action, for example.

Although the power distribution mechanism 16 of the embodiment has the different portion carrier CA0 coupled to the engine 8, the different portion sun gear S0 coupled to the first electric motor M1, and the different portion ring gear R0 coupled to the transmitting member 18, these coupling relationships are not necessarily limited thereto, and the engine 8, the first electric motor M1, and the transmitting member 18 may be coupled to any of the three elements CA0, S0, and R0 of the differential potion planetary gear device 24.

Although the engine 8 is directly coupled to the input shaft 14 in the embodiment, the engine 8 may be coupled operatively via a gear or a belt, for example, and may not necessarily be disposed on the common shaft center.

Although the first electric motor M1 and the second electric motor M2 are concentrically disposed on the input shaft 14 in the embodiment with the first electric motor M1 coupled to the different portion sun gear S0 and the second electric motor M2 coupled to the transmitting member 18, the electric motors may not necessarily be disposed in this way and, for example, the first electric motor M1 may be coupled to the different portion sun gear S0 and the second electric motor M2 may be coupled to the transmitting member 18 operatively via a gear, a belt, a reduction device, etc.

In the embodiment, the hydraulic friction engagement devices such as the first clutch C1 and the second clutch C2 may be made up of magnetic, electromagnetic, and mechanical engagement devices such as powder (magnetic particle) clutches, electromagnetic clutches, and meshing type dog clutches. For example, in the case of the electromagnetic clutches, the hydraulic control circuit 70 is made up of a switching device, an electromagnetic switching device, etc., that switch an electric command signal circuit to the electromagnetic clutches, instead of a valve device that switches oil passages.

Although the engine 8 is directly coupled to the differential portion 11 in the embodiment, the direct coupling may not necessarily be achieved and the engine 8 and the differential portion 11 may be coupled via a clutch.

Although the embodiment is configured such that the differential portion 11 and the automatic shifting portion 20 are serially connected, the configuration is not particularly limited thereto and, for example, a function of performing electric differential action of the power transmission device 10 as a whole may be included along with a function of shifting based on the principle different from the shifting by the electric differential action of the power transmission device 10 as a whole, and the differential portion 11 and the automatic shifting portion 20 may not mechanically be independent. The disposition positions and the disposition orders thereof may not particularly be limited. In short, the automatic shifting portion 20 may be disposed so as to make up a portion of the power transmission path from the engine 8 to the drive wheels 34.

Although the power distribution mechanism 16 of the embodiment is made up of one planetary gear device (the differential potion planetary gear device 24), the power distribution mechanism 16 may be made up of two or more planetary gear devices and may function as a transmission having three or more stages in the non-differential state (constant shift state). The differential potion planetary gear device 24 is not limited to the single pinion type and may be a double pinion type planetary gear device. Even when the power distribution mechanism 16 is made up of two or more planetary gear devices, the rotating elements of the planetary gear devices are coupled in a power transmittable manner to the engine 8, the first and second electric motors M1, M2, the transmitting member 18, and the output shaft 22 in some configurations such that the stepped shifting and the stepless shifting are switched by controlling the clutches C and the brakes B connected to the rotating elements of the planetary gear devices.

Although the first electric motor M1 is directly coupled to the second rotating element RE2 and the second electric motor M2 is directly coupled to the third rotating element RE3 in the power transmission device 10 of the embodiment, the first electric motor M1 may be coupled via an engagement element such as a clutch to the second rotating element RE2 and the second electric motor M2 may be coupled via an engagement element such as a clutch to the third rotating element RE3.

Although the second electric motor M2 is coupled to the transmitting member 18 making up a portion of the power transmission path from the engine 8 to the drive wheels 34 in the embodiment, the power transmission device 10 may be configured such that the second electric motor M2 is allowed to couple via an engagement element such as a clutch to the power distribution mechanism 16 in addition to being coupled to the power transmission path so as to control the differential state of the power distribution mechanism 16 through the second electric motor M2 instead of the first electric motor M1.

Although the differential portion 11 includes the first electric motor M1 and the second electric motor M2 in the embodiment, the first electric motor M1 and the second electric motor M2 may be included in the power transmission device 10 separately from the differential portion 11.

Although not exemplary illustrated one by one, the present invention is implemented with various modifications applied without departing from the spirit thereof.

NOMENCLATURE OF ELEMENTS

6: vehicle
8: engine
10: power transmission device (vehicle power transmission device)
11: differential portion (electric differential portion)
16: power distribution mechanism (differential mechanism)
20: automatic shifting portion (automatic transmission)
34: drive wheel
42: air conditioner
56: electric storage device
80: electronic control device (control device)
M1: first electric motor (electric generator)
M2: second electric motor (electric generator)

The invention claimed is:

1. A control device for a vehicle power transmission device having a stepped automatic transmission making up a portion of a power transmission path between an engine and a drive wheel, the control device comprising:
a shift control portion configured to execute a shift of the automatic transmission based on a predetermined shift point, the predetermined shift point including a first shift point of the automatic transmission being set in accordance with a request drive force of a driver and a vehicle speed and a second shift point of the automatic transmission being set in accordance with a rotation speed of the engine and the vehicle speed; and
a shift point setting portion configured to change the first shift point to the second shift point in a case of a predetermined fuel consumption priority running state of a vehicle.

2. The control device for the vehicle power transmission device of claim 1, wherein
the case of the predetermined fuel consumption priority running state of the vehicle is a case that a fuel consumption priority running mode is manually selected to improve fuel consumption as compared to when the fuel consumption priority running mode is not selected.

3. The control device for the vehicle power transmission device of claim 1, wherein
the control device is disposed with an electric storage device charged by an electric generator rotationally driven by the engine, and wherein
the case of the predetermined fuel consumption priority running state of the vehicle is a case that an output request amount requested to the engine for charging the electric storage device is equal to or greater than a predetermined output request amount determination value.

4. The control device for the vehicle power transmission device of claim 1, wherein
the case of the predetermined fuel consumption priority running state of the vehicle is a case that a remaining amount of fuel to be supplied to the engine is less than a predetermined fuel remaining amount determination value.

5. The control device for the vehicle power transmission device of claim 1, wherein
the control device is disposed with an electric storage device charged by an electric generator rotationally driven by the engine, and wherein
the case of the predetermined fuel consumption priority running state of the vehicle is a case that a charge remaining amount of the electric storage device is less than a predetermined charge remaining amount determination value while an output request amount requested to the engine for charging the electric storage device is equal to or greater than a predetermined output request amount determination value.

6. The control device for the vehicle power transmission device of claim 1, wherein
the control device is disposed with an electric storage device charged by an electric generator rotationally driven by the engine and an air conditioner for performing air-conditioning inside the vehicle with output of the engine, and wherein
the case of the predetermined fuel consumption priority running state of the vehicle is a case that an air-conditioner request power necessary for driving the air conditioner is equal to or greater than a predetermined air-conditioner request power determination value while an output request amount requested to the engine for charging the electric storage device is equal to or greater than a predetermined output request amount determination value.

7. The control device for the vehicle power transmission device of claim 1, further comprising:
a shift point setting change prohibiting portion configured to prohibit the shift point setting portion changing the first shift point to the second shift point when a variation of the request drive force within a predetermined period is equal to or greater than a predetermined request drive force variation determination value.

8. The control device for the vehicle power transmission device of claim 1, further comprising:
a shift point setting change prohibiting portion configured to prohibit the shift point setting portion changing the first shift point to the second shift point when a power running mode is manually selected to improve acceleration response during running of a vehicle as compared to when the power running mode is not selected.

9. The control device for the vehicle power transmission device of claim 1, wherein
the control device is disposed with an electric differential portion including a differential mechanism coupled between the engine and the automatic transmission, a first electric motor coupled to the differential mechanism in a power transmittable manner, and a second electric motor coupled to the drive wheel in a power transmittable manner with the differential state of the differential mechanism controlled by controlling an operating state of the first electric motor.

10. The control device for the vehicle power transmission device of claim 2, wherein
the control device is disposed with an electric storage device charged by an electric generator rotationally driven by the engine, and wherein
the case of the predetermined fuel consumption priority running state of the vehicle is a case that an output request amount requested to the engine for charging the electric storage device is equal to or greater than a predetermined output request amount determination value.

11. The control device for the vehicle power transmission device of claim 2, wherein
the case of the predetermined fuel consumption priority running state of the vehicle is a case that a remaining amount of fuel to be supplied to the engine is less than a predetermined fuel remaining amount determination value.

12. The control device for the vehicle power transmission device of claim 2, wherein
the control device is disposed with an electric storage device charged by an electric generator rotationally driven by the engine, and wherein
the case of the predetermined fuel consumption priority running state of the vehicle is a case that a charge remaining amount of the electric storage device is less than a predetermined charge remaining amount determination value while an output request amount requested to the engine for charging the electric storage device is equal to or greater than a predetermined output request amount determination value.

13. The control device for the vehicle power transmission device of claim 2, wherein
the control device is disposed with an electric storage device charged by an electric generator rotationally driven by the engine and an air conditioner for performing air-conditioning inside the vehicle with output of the engine, and wherein
the case of the predetermined fuel consumption priority running state of the vehicle is a case that an air-conditioner request power necessary for driving the air conditioner is equal to or greater than a predetermined air-conditioner request power determination value while an output request amount requested to the engine for charging the electric storage device is equal to or greater than a predetermined output request amount determination value.

14. The control device for the vehicle power transmission device of claim 2, further comprising:
a shift point setting change prohibiting portion configured to prohibit the shift point setting portion changing the first shift point to the second shift point when a variation of the request drive force within a predetermined period is equal to or greater than a predetermined request drive force variation determination value.

15. The control device for the vehicle power transmission device of claim 3, wherein
the case of the predetermined fuel consumption priority running state of the vehicle is a case that a remaining amount of fuel to be supplied to the engine is less than a predetermined fuel remaining amount determination value.

16. The control device for the vehicle power transmission device of claim 3, further comprising:
a shift point setting change prohibiting portion configured to prohibit the shift point setting portion changing the first shift point to the second shift point when a variation of the request drive force within a predetermined period is equal to or greater than a predetermined request drive force variation determination value.

17. The control device for the vehicle power transmission device of claim 4, further comprising:
a shift point setting change prohibiting portion configured to prohibit the shift point setting portion changing the first shift point to the second shift point when a variation of the request drive force within a predetermined period is equal to or greater than a predetermined request drive force variation determination value.

18. The control device for the vehicle power transmission device of claim 10, wherein
the case of the predetermined fuel consumption priority running state of the vehicle is a case that a remaining amount of fuel to be supplied to the engine is less than a predetermined fuel remaining amount determination value.

19. The control device for the vehicle power transmission device of claim 10, further comprising:
a shift point setting change prohibiting portion configured to prohibit the shift point setting portion changing the first shift point to the second shift point when a variation of the request drive force within a predetermined period is equal to or greater than a predetermined request drive force variation determination value.

20. The control device for the vehicle power transmission device of claim 11, further comprising:
a shift point setting change prohibiting portion configured to prohibit the shift point setting portion changing the first shift point to the second shift point when a variation of the request drive force within a predetermined period is equal to or greater than a predetermined request drive force variation determination value.

* * * * *